United States Patent
Wang et al.

(10) Patent No.: US 11,838,080 B2
(45) Date of Patent: Dec. 5, 2023

(54) SIDELINK CHANNEL STATE INFORMATION REPORTING FOR SIDELINK RELAYING THAT USES MULTIPLE TRANSMIT RECEIVE POINTS

(71) Applicant: QUALCOMM Incorporated, San Diego, CA (US)

(72) Inventors: Hua Wang, Basking Ridge, NJ (US); Sony Akkarakaran, Poway, CA (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 85 days.

(21) Appl. No.: 17/329,877

(22) Filed: May 25, 2021

(65) Prior Publication Data

US 2021/0391907 A1    Dec. 16, 2021

Related U.S. Application Data

(60) Provisional application No. 63/038,412, filed on Jun. 12, 2020.

(51) Int. Cl.
*H04W 72/542* (2023.01)
*H04L 1/00* (2006.01)
(Continued)

(52) U.S. Cl.
CPC ......... *H04B 7/0626* (2013.01); *H04B 7/0632* (2013.01); *H04B 7/0639* (2013.01); *H04B 17/336* (2015.01); *H04W 92/18* (2013.01)

(58) Field of Classification Search
CPC .. H04B 7/0626; H04B 17/336; H04B 7/0632; H04B 7/0639; H04W 92/18
See application file for complete search history.

(56) References Cited

U.S. PATENT DOCUMENTS

| | | |
|---|---|---|
| 2013/0322276 A1 | 12/2013 | Pelletier et al. |
| 2020/0022089 A1 | 1/2020 | Guo |

(Continued)

FOREIGN PATENT DOCUMENTS

| | | | | |
|---|---|---|---|---|
| CN | 103516464 B | * | 4/2018 | |
| WO | WO-2018127149 A1 | * | 7/2018 | ............. H04B 7/024 |

OTHER PUBLICATIONS

International Search Report and Written Opinion—PCT/US2021/034171—ISA/EPO—Aug. 12, 2021 (205583WO).

(Continued)

*Primary Examiner* — Jeffrey M Rutkowski
*Assistant Examiner* — Christopher Nguyen
(74) *Attorney, Agent, or Firm* — Harrity & Harrity, LLP

(57) ABSTRACT

Various aspects of the present disclosure generally relate to wireless communication. In some aspects, a user equipment may receive a configuration that indicates multiple sidelink channel state information (CSI) reporting sets, wherein different sidelink CSI reporting sets include different combinations of CSI parameters; receive an indication of a sidelink CSI reporting set, of the multiple sidelink CSI reporting sets, to be reported in a sidelink CSI report; and transmit the sidelink CSI report, wherein the sidelink CSI report includes a set of values for one or more CSI parameters included in the indicated sidelink CSI reporting set. Numerous other aspects are provided.

30 Claims, 14 Drawing Sheets

(51) Int. Cl.
*H04W 72/21* (2023.01)
*H04B 7/06* (2006.01)
*H04B 17/336* (2015.01)
*H04W 92/18* (2009.01)

(56) References Cited

U.S. PATENT DOCUMENTS

| | | | |
|---|---|---|---|
| 2020/0245173 A1* | 7/2020 | Kusashima | H04B 7/088 |
| 2021/0282099 A1* | 9/2021 | Osawa | H04W 72/12 |
| 2022/0007403 A1* | 1/2022 | Li | H04W 72/20 |
| 2022/0053513 A1* | 2/2022 | Ryu | H04W 72/1263 |
| 2022/0217741 A1* | 7/2022 | Yoshioka | H04L 1/0026 |
| 2022/0286255 A1* | 9/2022 | Guo | H04B 7/0626 |

OTHER PUBLICATIONS

NTT Docomo Inc., "Sidelink Physical Layer Procedure for NR V2X", 3GPP Draft, 3GPP TSG RAN WG1 #98, R1-1909190_DCM_SL PHY Procedure_FIN, 3rd Generation Partnership Project (3GPP), Mobile Competence Centre, 650, Route Des Lucioles, F-06921 Sophia-Antipolis Cedex, France, vol. RAN WG1, No. Prague, CZ, Aug. 26, 2019-Aug. 30, 2019, Aug. 17, 2019 (Aug. 17, 2019), XP051765795, pp. 1-14, Retrieved from the Internet: URL: http://www.3gpp.org/ftp/tsg_ran/WG1_RL1/TSGR1_98/Docs/R1-1909190.zip [retrieved on Aug. 17, 2019] p. 3, Proposal 2 p. 4, Proposal 3 p. 7, Proposal 7, Section 2.2, p. 8-p. 9; figure 4, section 2.1.

* cited by examiner

SIDELINK CHANNEL STATE INFORMATION REPORTING FOR SIDELINK RELAYING THAT USES MULTIPLE TRANSMIT RECEIVE POINTS

CROSS-REFERENCE TO RELATED APPLICATION

This Patent Application claims priority to U.S. Provisional Patent Application No. 63/038,412, filed on Jun. 12, 2020, entitled "SIDELINK CHANNEL STATE INFORMATION REPORTING FOR SIDELINK RELAYING THAT USES MULTIPLE TRANSMIT RECEIVE POINTS," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for sidelink channel state information reporting for sidelink relaying that uses multiple transmit receive points.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A user equipment may communicate with a base station via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication, performed by a user equipment, may include receiving a configuration that indicates multiple sidelink channel state information (CSI) reporting sets, wherein different sidelink CSI reporting sets include different combinations of CSI parameters; receiving an indication of a sidelink CSI reporting set, of the multiple sidelink CSI reporting sets, to be reported in a sidelink CSI report; and transmitting the sidelink CSI report, wherein the sidelink CSI report includes a set of values for one or more CSI parameters included in the indicated sidelink CSI reporting set.

In some aspects, a method of wireless communication, performed by a base station, may include transmitting a configuration that indicates multiple sidelink CSI reporting sets, wherein different sidelink CSI reporting sets include different combinations of CSI parameters; and transmitting an indication of a sidelink CSI reporting set, of the multiple sidelink CSI reporting sets, to be reported in a sidelink CSI report.

In some aspects, a user equipment for wireless communication may include a memory and one or more processors coupled to the memory. The one or more processors may be configured to receive a configuration that indicates multiple sidelink CSI reporting sets, wherein different sidelink CSI reporting sets include different combinations of CSI parameters; receive an indication of a sidelink CSI reporting set, of the multiple sidelink CSI reporting sets, to be reported in a sidelink CSI report; and transmit the sidelink CSI report, wherein the sidelink CSI report includes a set of values for one or more CSI parameters included in the indicated sidelink CSI reporting set.

In some aspects, a base station for wireless communication may include a memory and one or more processors coupled to the memory. The one or more processors may be configured to transmit a configuration that indicates multiple sidelink CSI reporting sets, wherein different sidelink CSI reporting sets include different combinations of CSI parameters; and transmit an indication of a sidelink CSI reporting set, of the multiple sidelink CSI reporting sets, to be reported in a sidelink CSI report.

In some aspects, a non-transitory computer-readable medium may store one or more instructions for wireless communication. The one or more instructions, when executed by one or more processors of a user equipment (UE), may cause the one or more processors to receive a configuration that indicates multiple sidelink CSI reporting sets, wherein different sidelink CSI reporting sets include different combinations of CSI parameters; receive an indication of a sidelink CSI reporting set, of the multiple sidelink CSI reporting sets, to be reported in a sidelink CSI report; and transmit the sidelink CSI report, wherein the sidelink CSI report includes a set of values for one or more CSI parameters included in the indicated sidelink CSI reporting set.

In some aspects, a non-transitory computer-readable medium may store one or more instructions for wireless communication. The one or more instructions, when executed by one or more processors of a base station, may cause the one or more processors to transmit a configuration that indicates multiple sidelink CSI reporting sets, wherein different sidelink CSI reporting sets include different combinations of CSI parameters; and transmit an indication of a sidelink CSI reporting set, of the multiple sidelink CSI reporting sets, to be reported in a sidelink CSI report.

In some aspects, an apparatus for wireless communication may include means for receiving a configuration that indicates multiple sidelink CSI reporting sets, wherein different sidelink CSI reporting sets include different combinations of CSI parameters; means for receiving an indication of a sidelink CSI reporting set, of the multiple sidelink CSI reporting sets, to be reported in a sidelink CSI report; and means for transmitting the sidelink CSI, wherein the sidelink CSI report includes a set of values for one or more CSI parameters included in the indicated sidelink CSI reporting set.

In some aspects, an apparatus for wireless communication may include means for transmitting a configuration that indicates multiple sidelink CSI reporting sets, wherein different sidelink CSI reporting sets include different combinations of CSI parameters; and means for transmitting an indication of a sidelink CSI reporting set, of the multiple sidelink CSI reporting sets, to be reported in a sidelink CSI report.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technologies (RAT), aspects of the present disclosure can be applied to other RATs, such as a 3G RAT, a 4G RAT, and/or a RAT subsequent to 5G (e.g., 6G).

Figure 1:
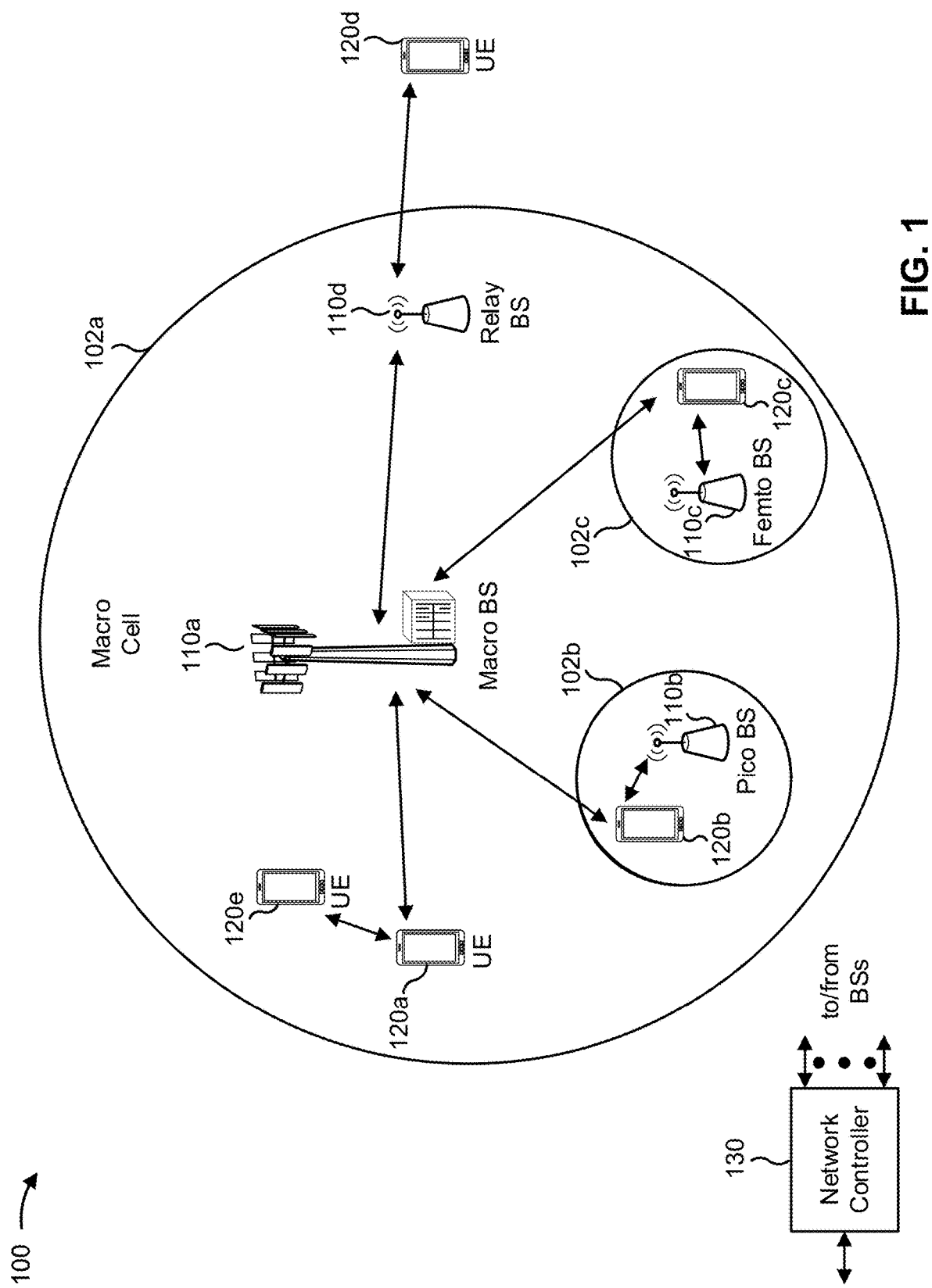
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network, an LTE network, and/or the like. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may be a relay UE that can relay transmissions for other UEs. In the example shown in FIG. 1, a relay UE 120a may communicate with macro BS 110a and a UE 120e in order to facilitate communication between BS 110a and UE 120e. A relay station may be a relay BS (also referred to as a relay base station, a relay, and/or the like) that can relay transmissions for UEs. In the example shown in FIG. 1, a relay station 110d may communicate with macro BS 110a and a UE 120d in order to facilitate communication between BS 110a and UE 120d.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like. In some aspects, the processor components and the memory components may be coupled together. For example, the processor components (e.g., one or more processors) and the memory components (e.g., a memory) may be operatively coupled, communicatively coupled, electronically coupled, electrically coupled, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

In some aspects, the UE 120 may receive a configuration that indicates multiple sidelink channel state information (CSI) reporting sets. In some aspects, different sidelink CSI reporting sets include different combinations of CSI parameters. The UE 120 may receive an indication of a sidelink CSI reporting set, of the multiple sidelink CSI reporting sets, to be reported in a sidelink CSI report. The UE 120 may transmit the sidelink CSI report. The sidelink CSI report may include a set of values for one or more CSI parameters included in the indicated sidelink CSI reporting set. Additionally, or alternatively, the UE 120 may perform one or more other operations described herein.

In some aspects, the base station 110 may transmit a configuration that indicates multiple sidelink CSI reporting sets. In some aspects, different sidelink CSI reporting sets include different combinations of CSI parameters. The base station 110 may transmit an indication of a sidelink CSI reporting set, of the multiple sidelink CSI reporting sets, to be reported in a sidelink CSI report. Additionally, or alternatively, the base station 110 may perform one or more other operations described herein.

As indicated above, FIG. 1 is provided as an example. Other examples may differ from what is described with regard to FIG. 1.

Figure 2:
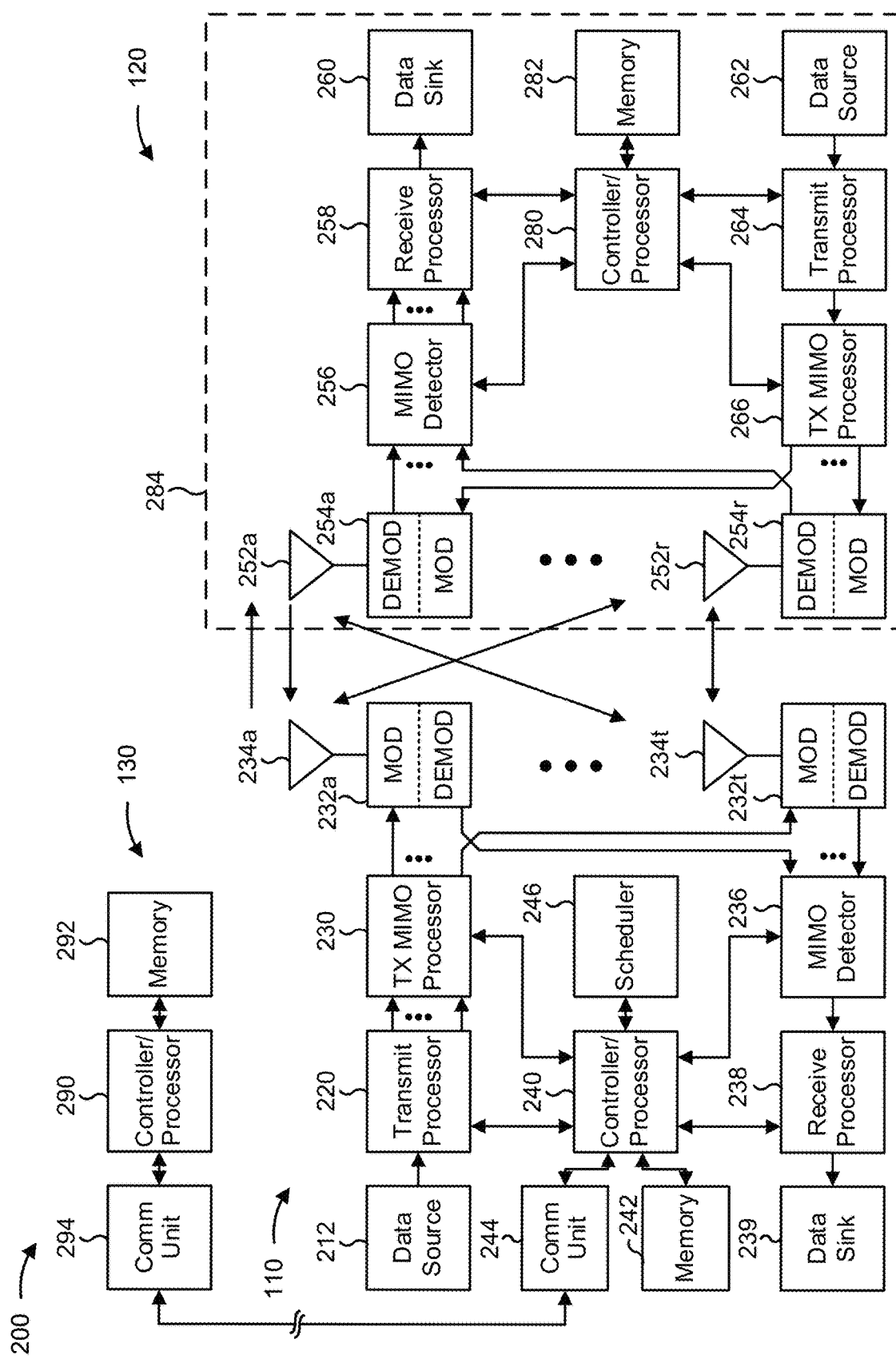
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., a cell-specific reference signal (CRS), a demodulation reference signal (DMRS), and/or the like) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), CQI, and/or the like. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

On the uplink, at UE 120, a transmit processor 264 may receive and process data from a data source 262 and control information (e.g., for reports that include RSRP, RSSI, RSRQ, CQI, and/or the like) from controller/processor 280.

Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 8-12.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 8-12.

Controller/processor 240 of base station 110, controller/processor 280 of UE 120, and/or any other component(s) of FIG. 2 may perform one or more techniques associated with sidelink channel state information reporting for sidelink relaying that uses multiple transmit receive points, as described in more detail elsewhere herein. For example, controller/processor 240 of base station 110, controller/processor 280 of UE 120, and/or any other component(s) of FIG. 2 may perform or direct operations of, for example, process 1100 of FIG. 11, process 1200 of FIG. 12, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code, program code, and/or the like) for wireless communication. For example, the one or more instructions, when executed (e.g., directly, or after compiling, converting, interpreting, and/or the like) by one or more processors of the base station 110 and/or the UE 120, may cause the one or more processors, the UE 120, and/or the base station 110 to perform or direct operations of, for example, process 1100 of FIG. 11, process 1200 of FIG. 12, and/or other processes as described herein. In some aspects, executing instructions may include running the instructions, converting the instructions, compiling the instructions, interpreting the instructions, and/or the like.

In some aspects, UE 120 may include means for receiving a configuration that indicates multiple sidelink channel state information (CSI) reporting sets, wherein different sidelink CSI reporting sets include different combinations of CSI parameters; means for receiving an indication of a sidelink CSI reporting set, of the multiple sidelink CSI reporting sets, to be reported in a sidelink CSI report; means for transmitting the sidelink CSI, wherein the sidelink CSI report includes a set of values for one or more CSI parameters included in the indicated sidelink CSI reporting set; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for transmitting a configuration that indicates multiple sidelink CSI reporting sets, wherein different sidelink CSI reporting sets include different combinations of CSI parameters; means for transmitting an indication of a sidelink CSI reporting set, of the multiple sidelink CSI reporting sets, to be reported in a sidelink CSI report; and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of processor 280.

As indicated above, FIG. 2 is provided as an example. Other examples may differ from what is described with regard to FIG. 2.

Figure 3:
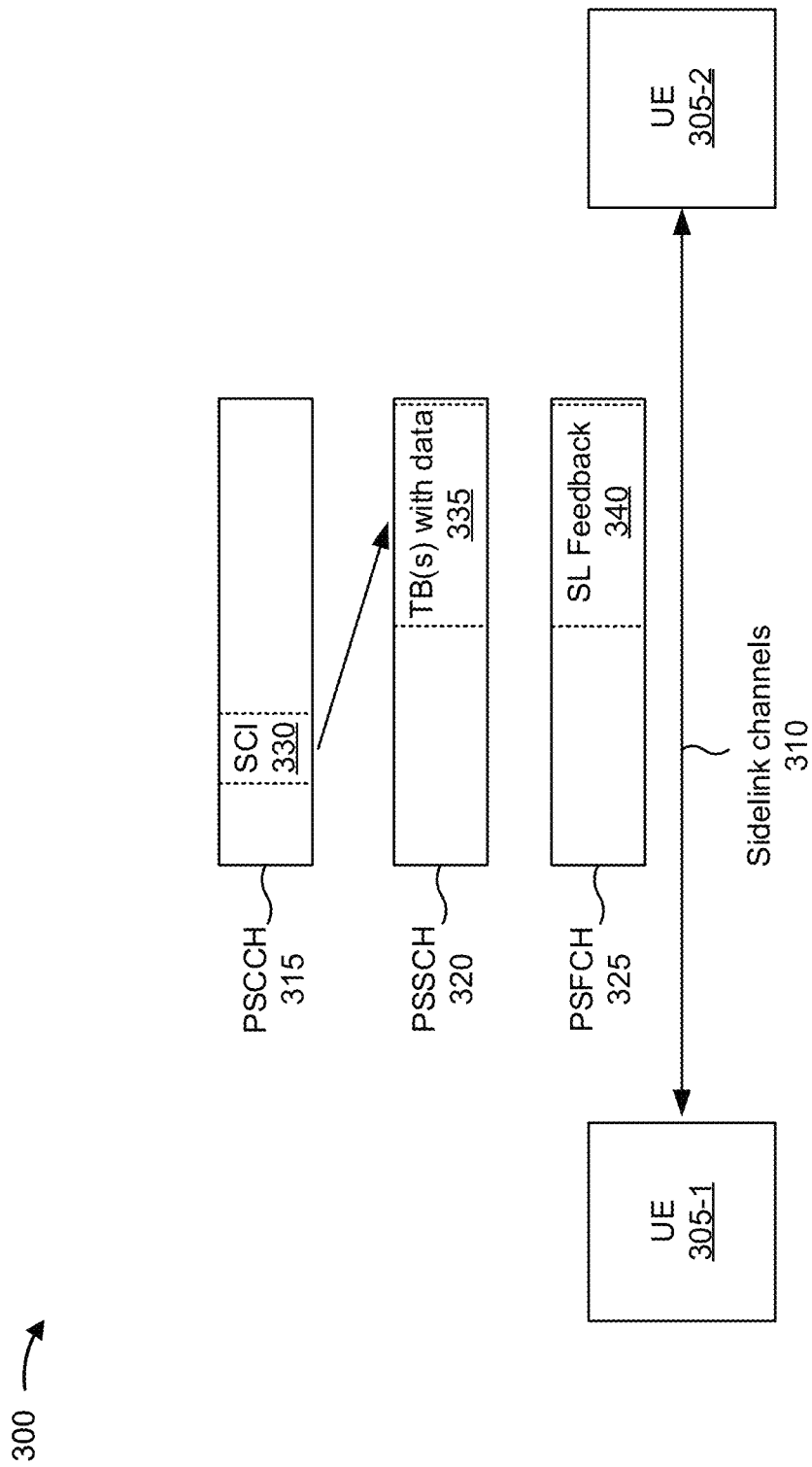
FIG. 3 is a diagram illustrating an example of sidelink communications, in accordance with the present disclosure.

FIG. 3 is a diagram illustrating an example 300 of sidelink communications, in accordance with the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, vehicle to pedestrian (V2P) communications, and/or the like), mesh networking, and/or the like. In some aspects, the UEs 305 (e.g., UE 305-1 and/or UE 305-2) may correspond to one or more other UEs described elsewhere herein, such as UE 120. In some aspects, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, symbols, and/or the like) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel. For example, the PSCCH 315 may carry sidelink control information (SCI) 330, which may indicate various control information used for sidelink communications, such as one or more resources (e.g., time resources, frequency resources, spatial resources, and/or the like) where a transport block (TB) 335 may be carried on the PSSCH 320. The TB 335 may include data. The PSFCH 325 may be used to communicate sidelink feedback 340, such as hybrid automatic repeat request (HARQ) feedback (e.g., acknowledgement or negative acknowledgement (ACK/NACK) information), transmit power control (TPC), a scheduling request (SR), and/or the like.

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a transmission mode where resource selection and/or scheduling is performed by the UE 305 (e.g., rather than a base station 110). In some aspects, the UE 305 may perform resource selection and/or scheduling by sensing channel availability for transmissions. For example, the UE 305 may measure a received signal strength indicator (RSSI) parameter (e.g., a sidelink-RSSI (S-RSSI) parameter) associated with various sidelink channels, may measure a reference signal received power (RSRP) parameter (e.g., a PSSCH-RSRP parameter) associated with various sidelink channels, may measure a reference signal received quality (RSRQ) parameter (e.g., a PSSCH-RSRQ parameter) associated with various sidelink channels, and/or the like, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources, channel parameters, and/or the like. Additionally, or alternatively, the UE 305 may perform resource selection and/or scheduling by determining a channel busy rate (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, a modulation and coding scheme (MCS) to be used for the upcoming sidelink transmission, and/or the like. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

As indicated above, FIG. 3 is provided as an example. Other examples may differ from what is described with respect to FIG. 3.

Figure 4:
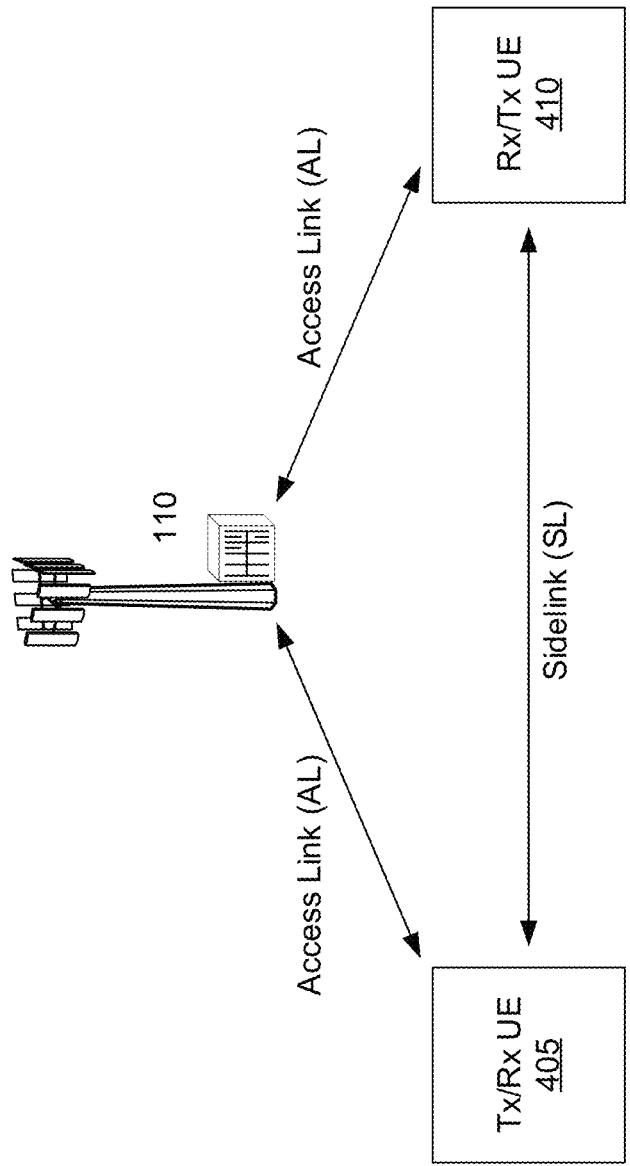
FIG. 4 is a diagram illustrating an example of sidelink communications and access link communications, in accordance with the present disclosure.

FIG. 4 is a diagram illustrating an example 400 of sidelink communications and access link communications, in accordance with the present disclosure.

As shown in FIG. 4, a transmitter (Tx) UE 405 and a receiver (Rx) UE 410 may communicate with one another via a sidelink, as described above in connection with FIG. 3. As further shown, in some sidelink modes, a base station 110 may communicate with the Tx UE 405 via a first access link. Additionally, or alternatively, in some sidelink modes, the base station 110 may communicate with the Rx UE 410 via a second access link. The Tx UE 405 and/or the Rx UE 410 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

As indicated above, FIG. 4 is provided as an example. Other examples may differ from what is described with respect to FIG. 4.

Figure 5:
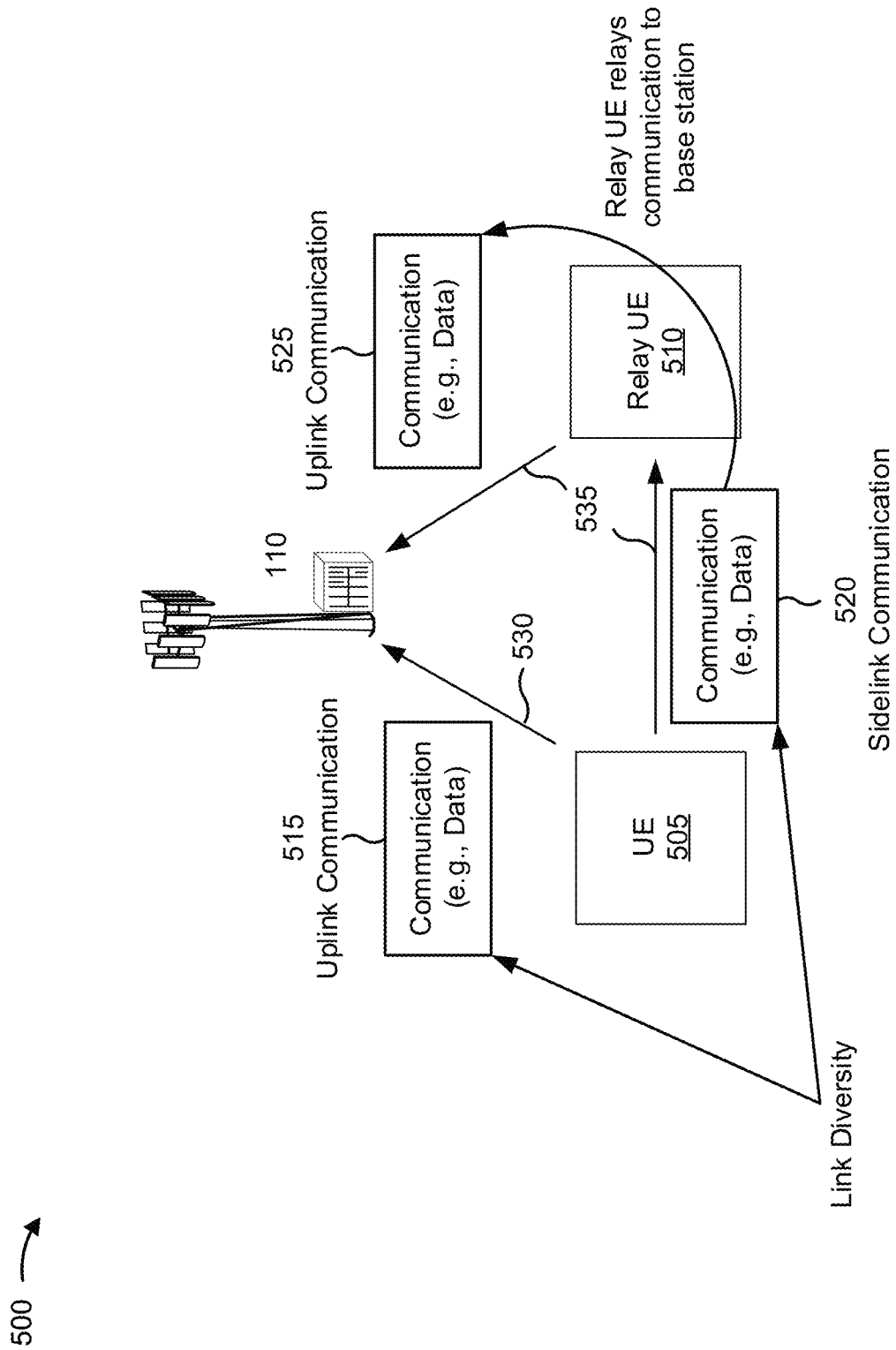
FIG. 5 is a diagram illustrating an example of a relay UE that relays communications between a UE and a base station, in accordance with the present disclosure.

FIG. 5 is a diagram illustrating an example 500 of a relay UE that relays communications between a UE and a base station, in accordance with the present disclosure. As shown, example 500 includes a UE 505, a relay UE 510, and a base station 110. In example 500, the UE 505 is a Tx UE, and the relay UE 510 is an Rx UE, as described elsewhere herein. In some aspects, the UE 505 is one UE 120, and the relay UE 510 is another UE 120. In some aspects, the UE 505 may be referred to as a remote UE.

As shown in FIG. 5, the UE 505 may transmit a communication (e.g., data, control information, and/or the like) directly to the base station 110 as an uplink communication 515. Additionally, or alternatively, the UE 505 may transmit a communication (e.g., data, control information, and/or the like) indirectly to the base station 110 via the relay UE 510. For example, the UE 505 may transmit the communication to the relay UE 510 as a sidelink communication 520, and the relay UE 510 may relay (e.g., forward, transmit, and/or the like) the communication to the base station 110 as an uplink communication 525.

In some aspects, the UE 505 may communicate directly with the base station 110 via a direct link 530. For example, the uplink communication 515 may be transmitted via the direct link 530. A communication transmitted via the direct link 530 between the UE 505 and the base station 110 (e.g., in the uplink communication 515) does not pass through and is not relayed by the relay UE 510. In some aspects, the UE 505 may communicate indirectly with the base station 110 via an indirect link 535. For example, the sidelink communication 520 and the uplink communication 525 may be transmitted via different segments of the indirect link 535. A communication transmitted via the indirect link 535 between the UE 505 and the base station 110 (e.g., in the sidelink communication 520 and the uplink communication 525) passes through and is relayed by the relay UE 510.

Using the communication scheme shown in FIG. 5 may improve network performance and increase reliability by providing the UE 505 with link diversity for communicating with the base station 110. For millimeter wave (e.g., frequency range 2, or FR2) communications, which are susceptible to link blockage and link impairment, this link diversity may improve reliability and prevent multiple retransmissions of data that may otherwise be retransmitted in order to achieve a successful communication. However, techniques described herein are not limited to millimeter wave communications, and may be used for sub-6 gigahertz (e.g., frequency range 1, or FR1) communications.

In some cases, the UE 505 may transmit a communication (e.g., the same communication) to the base station 110 via both the direct link 530 and the indirect link 535. In other cases, the UE 505 may select one of the links (e.g., either the direct link 530 or the indirect link 535), and may transmit a communication to the base station 110 using only the selected link. Alternatively, the UE 505 may receive an indication of one of the links (e.g., either the direct link 530 or the indirect link 535), and may transmit a communication to the base station 110 using only the indicated link. The indication may be transmitted by the base station 110 and/or the relay UE 510. In some aspects, such selection and/or indication may be based at least in part on channel conditions, link reliability, and/or the like.

As indicated above, FIG. 5 is provided as an example. Other examples may differ from what is described with respect to FIG. 5.

Figure 6:
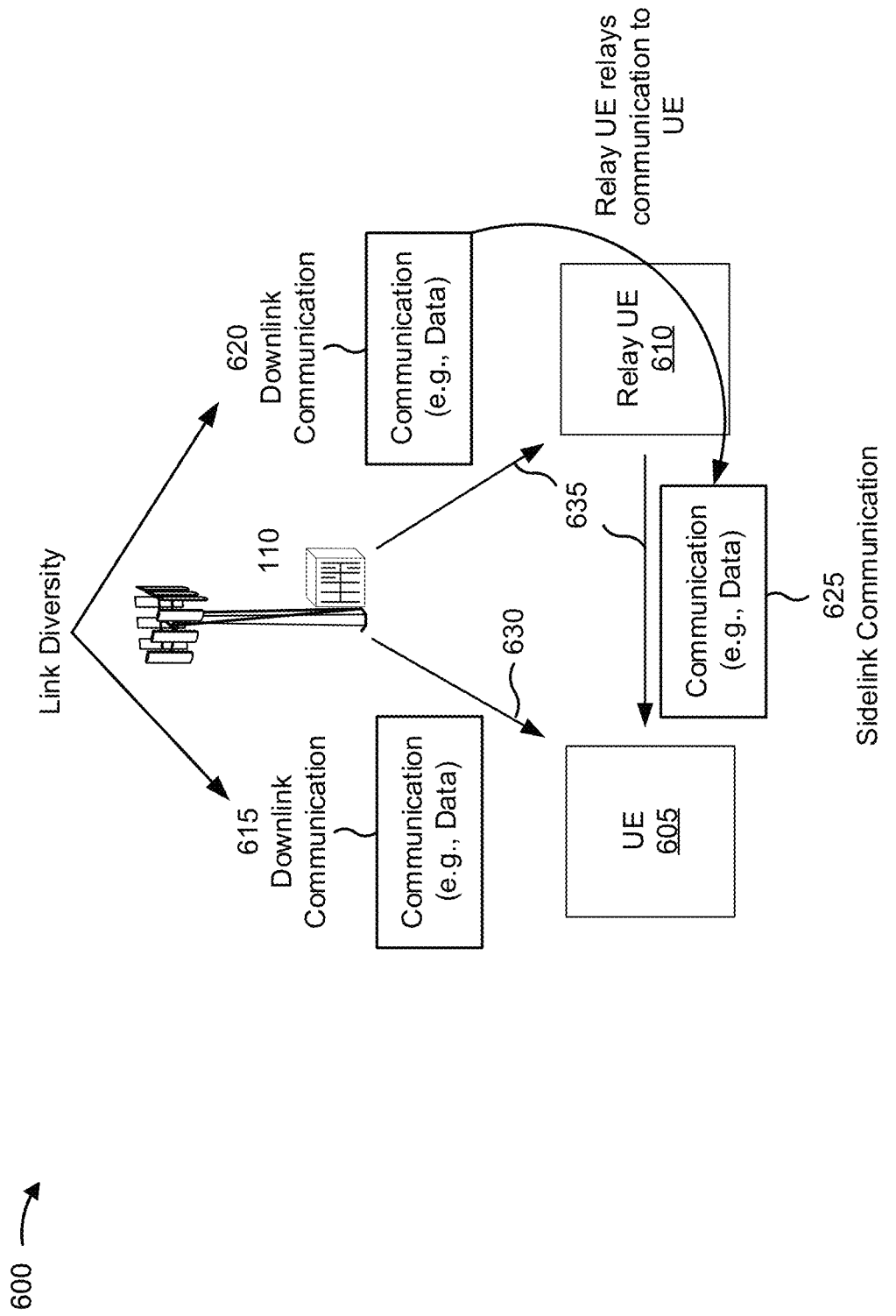
FIG. 6 is a diagram illustrating another example of a relay UE that relays communications between a UE and a base station, in accordance with the present disclosure.

FIG. 6 is a diagram illustrating an example 600 of a relay UE that relays communications between a UE and a base station, in accordance with the present disclosure. As shown, example 600 includes a UE 605, a relay UE 610, and a base station 110. In example 600, the UE 605 is an Rx UE, and the relay UE 610 is a Tx UE. In some aspects, the UE 605 is one UE 120, and the relay UE 610 is another UE 120. In some aspects, the UE 605 may be referred to as a remote UE.

As shown in FIG. 6, the UE 605 may receive a communication (e.g., data, control information, and/or the like) directly from the base station 110 as a downlink communication 615. Additionally, or alternatively, the UE 605 may receive a communication (e.g., data, control information, and/or the like) indirectly from the base station 110 via the relay UE 610. For example, the base station 110 may transmit the communication to the relay UE 610 as a downlink communication 620, and the relay UE 610 may relay (e.g., forward, transmit, and/or the like) the communication to the UE 605 as a sidelink communication 625.

In some aspects, the UE 605 may communicate directly with the base station 110 via a direct link 630. For example, the downlink communication 615 may be transmitted via the direct link 630. A communication transmitted via the direct link 630 between the UE 605 and the base station 110 (e.g., in the downlink communication 615) does not pass through and is not relayed by the relay UE 610. In some aspects, the UE 605 may communicate indirectly with the base station 110 via an indirect link 635. For example, the downlink communication 620 and the sidelink communication 625 may be transmitted via different segments of the indirect link 635. A communication transmitted via the indirect link 635 between the UE 605 and the base station 110 (e.g., in the downlink communication 620 and the sidelink communication 625) passes through and is relayed by the relay UE 610. As described above in connection with FIG. 5, using the communication scheme shown in FIG. 6 may improve network performance and increase reliability by providing the UE 605 with link diversity for communicating with the base station 110.

In some cases, the UE 605 may receive a communication (e.g., the same communication) from the base station 110 via both the direct link 630 and the indirect link 635. In other cases, the base station 110 may select one of the links (e.g., either the direct link 630 or the indirect link 635), and may transmit a communication to the UE 605 using only the selected link. Alternatively, the base station 110 may receive an indication of one of the links (e.g., either the direct link 630 or the indirect link 635), and may transmit a communication to the UE 605 using only the indicated link. The indication may be transmitted by the UE 605 and/or the relay UE 610. In some aspects, such selection and/or indication may be based at least in part on channel conditions, link reliability, and/or the like.

As indicated above, FIG. 6 is provided as an example. Other examples may differ from what is described with respect to FIG. 6.

Figure 7:
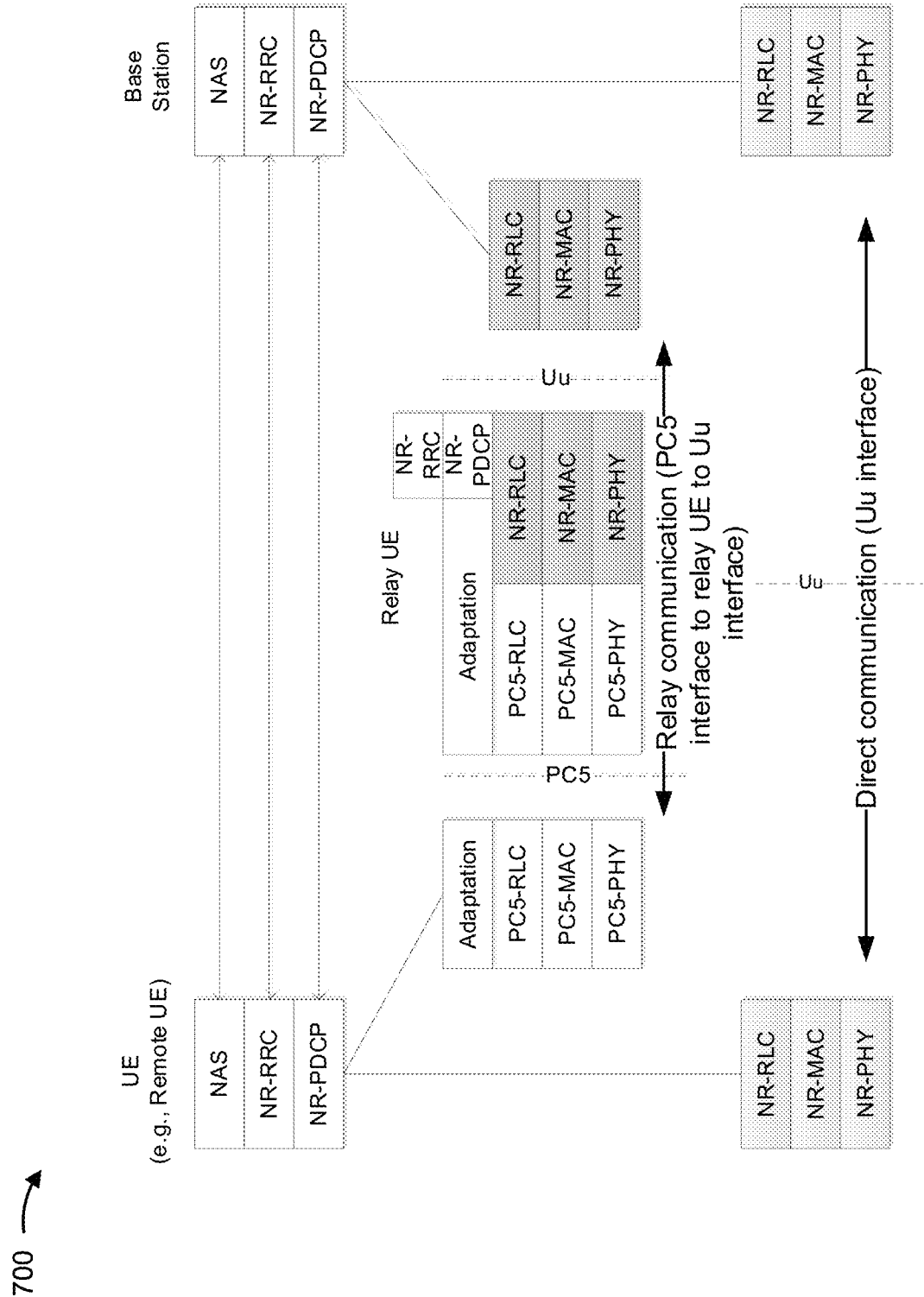
FIG. 7 is a diagram illustrating an example of a protocol stack for relaying communications between a UE and a base station via a relay UE that uses layer 2 relaying, in accordance with the present disclosure.

FIG. 7 is a diagram illustrating an example 700 of a protocol stack for relaying communications between a UE and a base station via a relay UE that uses layer 2 relaying, in accordance with the present disclosure.

As shown in FIG. 7, an NR protocol stack implemented on a UE (e.g., a remote UE or a relay UE) and on a base station includes a non-access stratum (NAS) layer, a radio resource control (RRC) layer, a packet data convergence protocol (PDCP) layer, and/or the like. As further shown in FIG. 7, the layers of the NR protocol stacks of the UE and the base station may correspond to each other. The PDCP layer may be layer 2 in the NR protocol stack and may include multiple sub-layers. For example, the PDCP layer may include a radio link control (RLC) sub-layer, a medium access control (MAC) sub-layer, a physical (PHY) sub-layer, and/or the like. In some aspects, the PDCP layer on a UE (e.g., a remote UE or a relay UE) may include an adaptation sub-layer (e.g., a service data adaptation protocol (SDAP) sub-layer) and/or the like.

When communicating directly with a base station (e.g., via a Uu interface), a UE (e.g., a remote UE) may communicate at an NR-RLC sub-layer, an NR-MAC sub-layer, and an NR-PHY layer. As shown in FIG. 7, the sub-layers in the UE may communicate with corresponding sub-layers in the base station. However, in a relay scenario, the UE may communicate via a PC5 interface (or another sidelink interface) with a relay UE. For example, the UE may include a PC5-RLC sub-layer, a PC5-MAC sub-layer, and a PC5-PHY sub-layer to communicate with a corresponding PC5-RLC sub-layer, PC5-MAC sub-layer, and PC5-PHY sub-layer of the relay UE. The relay UE may also include an NR-RLC sub-layer, an NR-MAC sub-layer, and an NR-PHY sub-layer to communicate via a Uu interface with corresponding sub-layers of the base station. The adaptation layer of the NR protocol stack on the UE may adapt communications from the NR protocol to the PC5 protocol. Based at least in part on passing information between PC5 sub-layers and NR sub-layers, the relay UE enables layer 2 relaying between the UE and the base station.

For aperiodic channel state information (CSI) reporting for sidelink communications, a Tx UE may transmit an aperiodic CSI request to an Rx UE, and may transmit one or more CSI reference signals (CSI-RSs). The Rx UE may measure the CSI-RS(s) to calculate CSI, which may include a CQI value, a precoding matrix indicator (PMI) value, a rank indicator (RI) value, a signal to interference plus noise ratio (SINR) value, a reference signal received power (RSRP) value, and/or the like. The Rx UE may transmit a CSI report to the Tx UE (e.g., in a medium access control (MAC) control element) to indicate the CSI calculated by the Rx UE. The Tx UE may determine one or more transmission parameters for a sidelink communication to be transmitted to the Rx UE based at least in part on the CSI.

The one or more transmission parameters may include, for example, a modulation and coding scheme (MCS), a transport block (TB) size, a resource allocation, a transmit power, and/or the like.

However, in a sidelink transmission mode where a base station assists with scheduling and/or controlling sidelink communications, the aperiodic CSI reporting procedure described above does not enable the base station to assist with selection or control of the transmission parameter(s). Accordingly, in some aspects, a base station may trigger sidelink aperiodic CSI reporting to assist with scheduling and/or controlling sidelink communications between a UE and a relay UE based at least in part on an aperiodic CSI report.

As indicated above, FIG. 7 is provided as an example. Other examples may differ from what is described with respect to FIG. 7.

Figure 8:
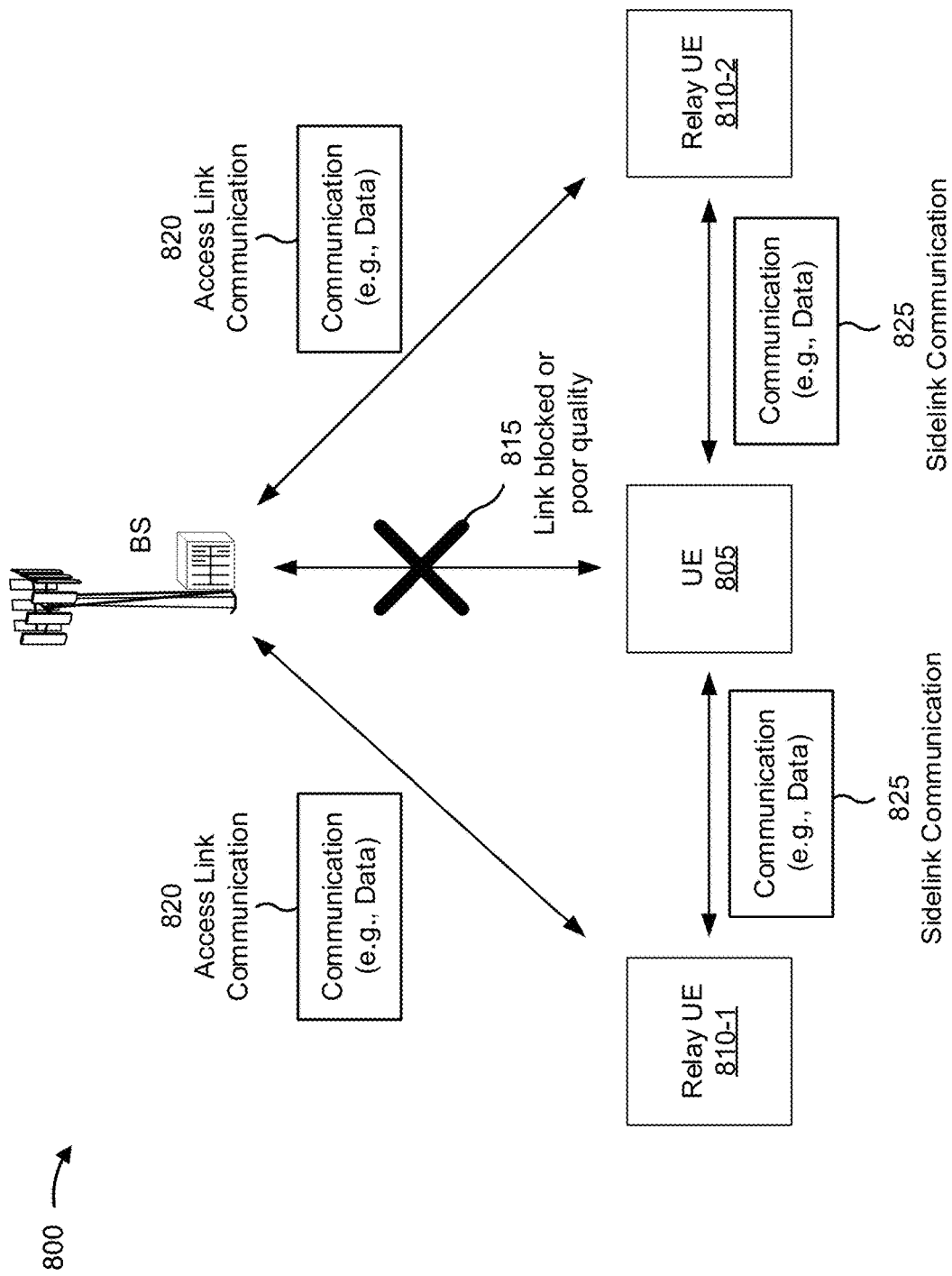
FIG. 8 is a diagram illustrating an example of using multiple relay UEs to relay communications between a UE and a base station, in accordance with the present disclosure.

FIG. 8 is a diagram illustrating an example 800 of using multiple relay UEs to relay communications between a UE and a base station, in accordance with the present disclosure. As shown in FIG. 8, example 800 includes a UE 805, a first relay UE 810-1, a second relay UE 810-2, and a base station. In example 800, the UE 805 can be a Tx UE and/or an Rx UE, and the relay UEs 810 can be Tx UEs and/or Rx UEs, as described elsewhere herein. The UE 805 may be a first UE, the relay UE 810-1 may be a second UE (or a first relay UE), and the relay UE 810-2 may be a third UE (or a second relay UE). In some aspects, the UE 805 may be referred to as a remote UE or a target UE.

As shown in FIG. 8, the UE 805 may communicate directly with the base station via a direct link 815. However, in the example 800 of FIG. 8, the direct link 815 between the UE 805 and the base station may be blocked or may have poor quality. In this case, the UE 805 may indirectly communicate with the base station via sidelink communications 825 with the relay UEs 810, which may communicate directly with the base station via access link communications 820. The access link communications 820 between the relay UEs 810 and the base station may include uplink communications and/or downlink communications. For example, the UE 805 may transmit a communication (e.g., data, control information, and/or the like) to the first relay UE 810-1 and/or the second relay UE 810-2 as a sidelink communication 825, and the first relay UE 810-1 and/or the second relay UE 810-2 may relay (e.g., forward, transmit, and/or the like) the communication to the base station as an access link communication 820. Additionally, and/or alternatively, the base station may transmit a communication (e.g., data, control information, and/or the like) to first relay UE 810-1 and/or the second relay UE 810-2 as an access link communication 820, and the first relay UE 810-1 and/or the second relay UE 810-2 may relay (e.g., forward, transmit, and/or the like) the communication to the UE 805 as a sidelink communication 825.

In some aspects, communications between the base station and the UE 805 may be relayed by the first relay UE 810-1 and the second relay UE 810-2 using multiple transmit receive points (multi-TRP) sidelink relaying. Multi-TRP sidelink relaying uses multiple relay UEs 810 to transmit a communication from the base station to the UE 805 and/or to transmit a communication from the UE 805 to the base station. For example, assume that data packets from the base station have a destination of the UE 805. However, the direct link 815 from the base station to the UE 805 may be blocked or may have poor quality. The base station may transmit a TB (or multiple TBs) including the data packets to the first relay UE 810-1 and the second relay UE 810-2. The first relay UE 810-1 and the second relay UE 810-2 may use multi-TRP transmission to relay the data packets from the base station to the UE 805. The base station may coordinate the multi-TRP sidelink relaying. For example, the base station may coordinate the multi-TRP sidelink relaying using mode 1 sidelink resource allocation, in which the base station communicates to the relay UEs 810 which resources can be allocated by the relay UEs 810 for sidelink relaying.

As described above, CSI reporting may be performed for sidelink communications. For example, CSI reporting is supported for unicast communications in NR-V2X. A Tx UE (e.g., relay UE 810) may trigger CSI reporting by transmitting a CSI request to an Rx UE (e.g., UE 805) and transmitting one or more CSI-RSs to the Rx UE (e.g., UE 805) in the associated PSSCH. The Rx UE (e.g., UE 805) may measure the CSI-RS(s) to calculate CSI and may report CSI to the Tx UE (e.g., relay UE 810). For example, the Rx UE (e.g., UE 805) may report CSI to the Tx UE (e.g., relay UE 810) via a MAC control element. In some aspects, CSI in NR-V2X may include one bit for RI and four bits for CQI. In some aspects, parameters of CSI in NR may include a CQI value, a PMI value, a CSI-RS resource indicator (CRI) value, a layer indicator (LI) value, a synchronization signal/physical broadcast channel (SS/PBCH) resource block indicator (SSBRI) value, an RI value, a layer 1 RSRP (L1-RSRP) value, a layer 1 SINR (L1-SINR) value, and/or the like.

In some aspects, the base station may use CSI reports from the UE 805 and/or relay UEs 810 to coordinate multi-TRP sidelink relaying. The base station may trigger sidelink aperiodic CSI reporting to assist with scheduling and/or controlling sidelink communications between the UE 805 and the relay UE 810 based at least in part on an aperiodic CSI report. For example, the base station may use certain CSI parameters in a CSI report to rank the relay UEs 810 based on sideline channel quality (e.g., determine which link between one of the relay UEs 810 and the UE 805 has a better channel) and to perform layer mapping to coordinate the multi-TRP relaying by the relay UEs 810. The relay UEs 810 may use different CSI parameters in a CSI report to determine transmission parameters (e.g., MCS, pre-code matrix, TB size, code rate, transmit power, resource allocation, and/or the like) to be used to communicate with the UE 805. Thus, different CSI parameters may be used by the base station and relay UEs 810 for different purposes. For example, RI and/or CQI may be used by the base station for scheduling and/or controlling the joint transmission. L1-SINR and L1-RSRP may be used by the base station to determine which relaying link has a better channel. RI and/or PMI may be used by the base station when coordinating multi-TRP transmission by the relay UEs 810. PMI may be used by the individual relay UEs 810 for choosing a precoding matrix. Thus, the base station and/or the relay UEs 810 may not use all of the CSI parameters in a CSI report.

As described above, the base station and the relay UEs 810 use different CSI parameters for different purposes and may not use all of the parameters in the CSI report for sidelink relaying. Computing resources (e.g., processing resources, memory resources, communication resources, and/or the like), networking resources, and/or the like are consumed for the UE 805 to calculate and report all CSI parameters regardless of whether the CSI report is being used by the base station or one of the relay UEs 810.

Some techniques and apparatuses described herein enable a base station to configure different CSI reporting sets with different combinations of CSI parameters for a UE to report depending on the destination and/or purpose of the CSI report. As a result, the UE may report a particular combination of CSI parameters corresponding to the destination and/or purpose of the CSI report and, thus, conserve computing resources, networking resources, and/or the like that would otherwise have been consumed by the UE to calculate and report all CSI parameters regardless of the destination and/or purpose of the CSI report.

As indicated above, FIG. 8 is provided as an example. Other examples may differ from what is described with respect to FIG. 8.

Figure 9:
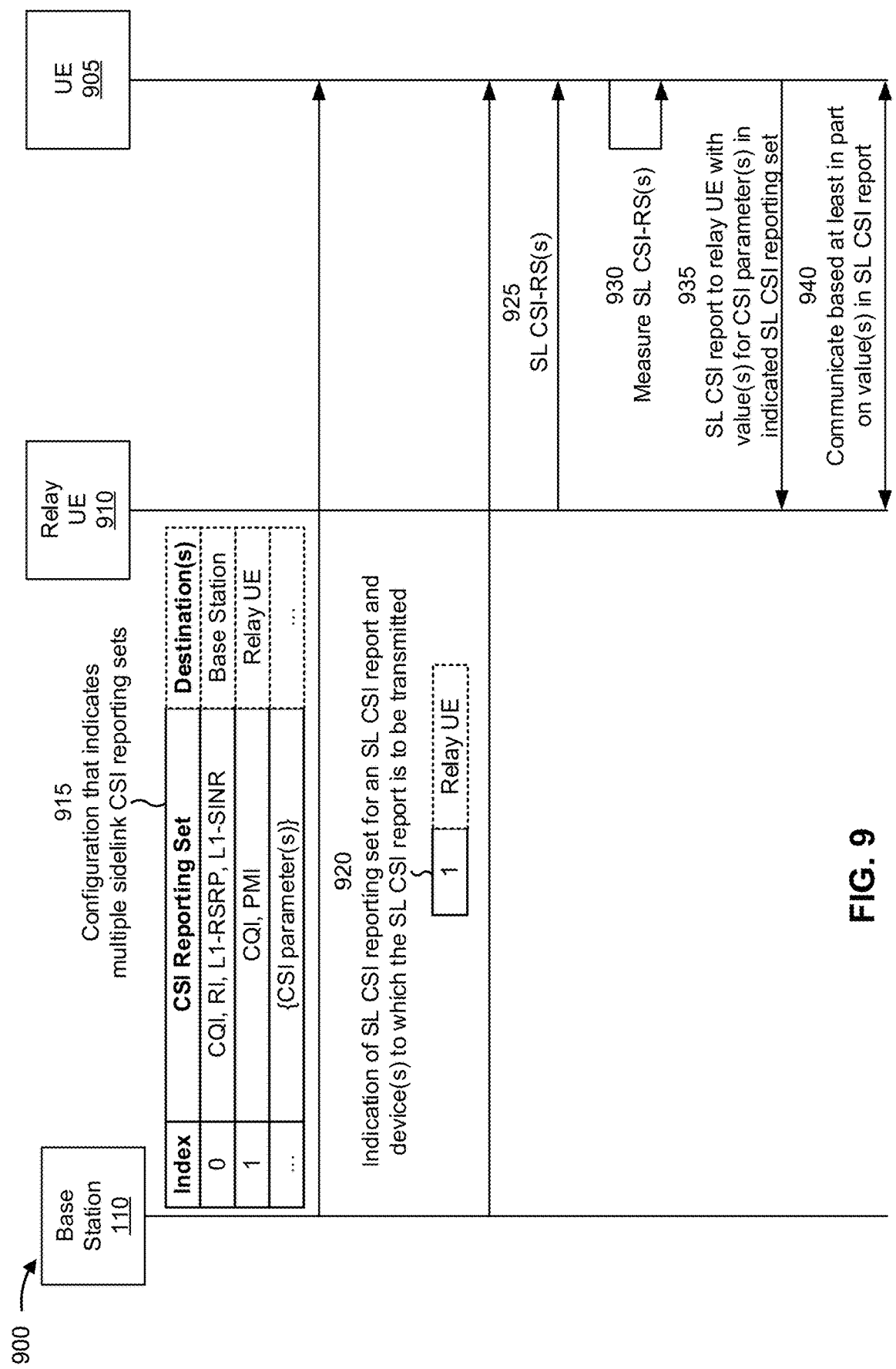
FIG. 9 is a diagram illustrating an example associated with sidelink channel state information reporting for sidelink relaying, in accordance with the present disclosure.

FIG. 9 is a diagram illustrating an example 900 associated with sidelink channel state information reporting for sidelink relaying, in accordance with the present disclosure. As shown in FIG. 9, a base station 110, a UE 905, and a relay UE 910 may communicate with one another. The UE 905 and the relay UE 910 may communicate with one another via a sidelink. The base station 110 and the relay UE 910 may communicate with one another via an access link. The UE 905 and the base station 110 may communicate with one another via a direct link (e.g., an access link, such as when communications between the UE 905 and the base station 110 are not relayed by the relay UE 910) and/or via an indirect link (e.g., an access link and a sidelink, such as when communications between the UE 905 and the base station 110 are relayed by the relay UE 910). In some aspects, the UE 905 and/or the relay UE 910 may be a UE described elsewhere herein in connection with FIGS. 1-8. For example, the relay UE 910 may be configured to relay communications between the base station 110 and the UE 905. In some aspects, the relay UE 910 provides a layer 2 relay service for the UE 905, as described above in connection with FIG. 7. In example 900, the relay UE 910 may be a Tx UE and the UE 905 may be an Rx UE, or the relay UE 910 may be an Rx UE and the UE 905 may be a Tx UE. In some aspects, the relay UE 910 may be one of multiple relays that are used to perform multi-TRP sidelink relaying, as described above in connection with FIG. 8.

As shown by reference number 915, the base station 110 may transmit (e.g., using controller/processor 240, transmission component 1404, and/or the like) a configuration that indicates multiple sidelink (SL) CSI reporting sets to the UE 905. The different SL CSI reporting sets in the configuration include different combinations of CSI parameters. The base station 110 may transmit the configuration to the UE 905 using RRC signaling, downlink control information (DCI), and/or the like. In some aspects, the configuration may include a first SL CSI reporting set that includes CQI, RI, L1-RSRP, and L1-SINR parameters and a second SL CSI reporting set that includes CQI and PMI parameters, as shown in example 900 of FIG. 9. In some aspects, the configuration may include additional and/or alternative CSI reporting sets that include different CSI parameters from the SL CSI reporting sets shown in FIG. 9. For example, the configuration may include an SL CSI reporting set that includes L1-SINR and L1-RSRP, an SL CSI reporting set that includes L1-SINR, L1-RSRP, RI, and PMI, and/or another SL CSI reporting set with different CSI parameters in addition to and/or instead of the SL CSI reporting sets shown in FIG. 9.

The configuration may include a mapping between the SL CSI reporting sets and corresponding index values. For example, as shown in FIG. 9, the first SL CSI reporting set (CQI, RI, L1-RSRP, L1-SINR) is mapped to an index value of 0 and the second SL CSI reporting set (CQI, PMI) is mapped to an index value of 1.

In some aspects, the SL CSI reporting sets may be associated with destinations to which corresponding CSI reports are to be transmitted. For example, the first SL CSI reporting set (CQI, RI, L1-RSRP, L1-SINR) may be associated with a destination of the base station 110, and the second SL CSI (CQI, PMI) may be associated with a destination of the relay UE 910. In some aspects, multiple CSI reporting sets may be associated with the same destination. For example, the configuration may include different CSI reporting sets that have different combinations of CSI parameters used to support different tasks at the same destination (e.g., the base station 110, the relay UE 910, and/or the like).

In some aspects, the configuration may specify corresponding destinations for the SL CSI reporting sets. For example, the configuration may specify a destination of the base station 110 for the first SL CSI reporting set and a destination of the relay UE 910 for the second SL CSI reporting set. In this case, both the SL CSI reporting sets and the corresponding destinations may be associated with the corresponding indexes. For example, an index of 0 may correspond to the first SL CSI reporting set and the base station 110 destination for the CSI report, and an index of 1 may correspond to the second SL CSI reporting set and the relay UE 910 destination for the CSI report. In some aspects, multiple destinations may be specified for an SL CSI reporting set. For example, multiple destinations may be included in a destination field associated with a SL CSI reporting set and corresponding index. Additionally, and/or alternatively, a single destination may by listed for an index value, with a subset of different index values corresponding to the same SL CSI reporting set and different destinations. In some aspects, the configuration may not include destination information for the CSI reporting sets.

In some aspects, the configuration may include a mapping between destinations (e.g., the base station 110, the relay UE 910, and/or the like) and corresponding index values, but not fixed destinations for the CSI reporting sets. In this case, the SL CSI reporting set and the destination for a CSI report may be indicated using a first index value to indicate the CSI reporting set (e.g., 0 for the first SL CSI reporting set, 1 for the second SL reporting set, and/or the like) and a second index value to indicate the destination (e.g., 0 for the base station 110, 1 for the relay UE 910, and/or the like).

In some aspects, the configuration may include an SL CSI reporting set for millimeter wave (e.g., FR2) sidelink communications that includes one or more of CQI, PMI, CRI, LI, R1, L1-RSRP, L1-SINR, or a combination thereof. For example, the SL CSI reporting set for millimeter wave (e.g., FR2) sidelink communications may include PMI, L1-SINR, and L1-RSRP parameters. Tx UEs (e.g., relay UE 910) may use PMI for rank>1 transmission. L1-RSRP and L1-SINR may be used for SL beam selection and/or refinement in FR2. From L1-RSRP and L1-SINR, the base station 110 can determine which SL of multiple SLs is better and use that information when deciding which relay UE (e.g., relay UE 910) to send a PSCCH.

As shown by reference number 920, the base station 110 may transmit (e.g., using controller/processor 240, transmission component 1404, and/or the like), to the UE 905, an indication of an SL reporting set for an SL CSI report and one or more destination devices (e.g., wireless communication devices, such as base station 110, relay UE 910, and/or the like) to which the SL CSI report is to be transmitted. The base station 110 may transmit the indication of the SL CSI reporting set and the one or more destination devices directly to the UE 905 in a PDCCH communication, a MAC control element, and/or the like. Additionally, and/or alternatively, the base station 110 may transmit the indication to the relay UE 910, which may then relay the indication to the UE 905.

The indication of the SL CSI reporting set may include an index value that corresponds to a respective CSI reporting set in the configuration. The index value indicates that the UE 905 is to use the corresponding SL CSI reporting set for the SL CSI report. For example, as shown in FIG. 9, the indication includes an index value of 1, which corresponds to the second SL CSI reporting set (CQI, PMI) in the configuration.

The indication transmitted by the base station 110 may also include an indication of one or more destination devices to which the SL CSI report is to be transmitted. The indication may indicate to the UE 905 to send the SL CSI report to the base station 110, a relay UE (e.g., relay UE 910) that relays communications between the UE 905 and the base station 110, a relay UE (e.g., relay UE 910) from which sidelink CSI-RSs for the sidelink CSI report are received, a combination thereof, and/or the like. For example, the indication may indicate to the UE 905 whether to send the SL CSI report to the base station 110 (e.g., through a Uu link) or to the relay UE 910 (or another relay UE) via an SL communication. In the example shown in FIG. 9, the destination for the SL CSI report is the relay UE 910.

The indication of one or more destination devices for the SL CSI report may be a single bit that provides an indication that corresponds to a particular wireless communication device and/or a particular set of wireless communications devices. For example, the indication may be a single bit that indicates that the destination device(s) is/are one of the base station 110, the relay UE 910, or the base station 110 and the relay UE 910.

In some aspects, the indication transmitted by the base station 110 may include a first indication of the SL CSI reporting set for the SL CSI report and a second indication of the one or more destination devices for the SL CSI report. For example, a first index may provide the indication of the SL CSI reporting set and a second index may provide an indication of the one or more destination devices. In the example shown FIG. 9, first and second index values of 1, 1 may provide indications to the UE 905 that the second SL CSI reporting set (CQI, PMI) is to be used for the SL CSI report and the SL CSI report is to be transmitted to the relay UE 910.

In some aspects, a single index may provide an indication of both the SL CSI reporting set and the one or more destination devices for the SL CSI report. In this case, the configuration may include corresponding destinations for the SL CSI reporting sets. Accordingly, the index that provides the indication of the SL CSI reporting set also provides the indication that the destination(s) associated with the SL CSI reporting set is the destination to which the SL CSI report is to be transmitted. For example, in the example shown in FIG. 9, the index value of 1 may provide an indication to the UE 905 that the second SL CSI reporting set is to be used for the SL CSI report and that the SL CSI report is to be transmitted to the relay UE 910.

As shown by reference number 925, the relay UE 910 may transmit (e.g., using controller/processor 280 and/or the like), to the UE 905, one or more SL CSI-RSs. As shown in FIG. 9, the relay UE 910 transmits the SL CSI-RS(s) on a sidelink channel to the UE 905. The relay UE 910 may transmit the SL CSI-RS(s) to the UE 905 based at least in part on receiving an SL CSI triggering message from the base station 110.

As shown by reference number 930, and based at least in part on receiving the SL CSI-RS(s) transmitted by the relay UE 910, the UE 905 may measure (e.g., using controller/processor 280, measurement component 1308, and/or the like) the SL CSI-RS(s) transmitted by the relay UE 910 (e.g., on the sidelink channel). Based at least in part on measuring the SL CSI-RS(s), the UE 905 may calculate, for the sidelink channel, the CSI parameters included in the SL CSI reporting set indicated for the SL CSI report. In the example shown in FIG. 9, the indication from the base station 110 indicates that the second CSI reporting set (CQI, PMI) is to be used for the SL CSI report. Thus, in the example of FIG. 9, the UE 905 may calculate a CQI value and a PMI value based at least in part on measuring the SL CSI-RS(s). In some aspects, the UE 905 may calculate only the CSI parameters included in the SL CSI reporting set indicated for the SL CSI report. In some aspects, the UE 905 may calculate one or more other CSI parameters in addition to the CSI parameters included in the SL CSI reporting set indicated for the SL CSI report, but the one or more other CSI parameters may not be included in the SL CSI report.

As shown by reference number 935, based at least in part on measuring the SL CSI-RS(s), the UE 905 may transmit (e.g., using controller/processor 280, transmission component 1304, and/or the like) an SL CSI report to the relay UE 910 for the CSI parameters in the indicated SL CSI reporting set. The SL CSI report may include values, calculated by the UE 905, for the CSI parameters included in the indicated SL CSI reporting set. In the example shown in FIG. 9, the indication from the base station 110 indicates that the second CSI reporting set (CQI, PMI) is to be used for the CSI report. Thus, in the example of FIG. 9, the SL CSI report may include the CQI value and the PMI value calculated by the UE 905 based at least in part on measuring the SL CSI-RS(s). The SL CSI report may be transmitted, by the UE 905, to one or more destination devices. In the example of FIG. 9, the indication from the base station 110 indicates that the destination for the SL CSI report is the relay UE 910. Thus, as shown in FIG. 9, the UE 905 may transmit the SL CSI report to the relay UE 910 on a sidelink channel.

As shown by reference number 940, the relay UE 910 and the UE 905 may communicate based at least in part on the values of the CSI parameters in the SL CSI report transmitted from the UE 905 to the relay UE 910. The relay UE 910 and the UE 905 communicate via a sidelink channel. The relay UE 910 may determine (e.g., using controller/processor 280 and/or the like) and/or adjust transmission parameters, such as an MCS, a pre-code matrix, a TB size, a code rate, a transmit power, a resource allocation, and/or the like, based at least in part on the values of the SL CSI parameters in the SL CSI report. In the example of FIG. 9, the SL CSI report transmitted from the UE 905 to the relay UE 910 includes a CQI value and a PMI value. In some aspects, the relay UE 910 may determine one or more transmission parameters (e.g., MCS, pre-code matrix, TB size, code rate, transmit power, resource allocation, and/or the like) for the sidelink channel between the relay UE 910 and the UE 905 based on the CQI value in the SL CSI report, the PMI value in the SL CSI report, and/or a combination thereof. For example, the relay UE 910 may select an MCS for communications on the sidelink channel based at least in part on the CQI value. The relay UE 910 may select a pre-code matrix for communications on the sidelink channel based at least in part on the PMI value. In some aspects, additional and/or alternative CSI parameters included in the CSI reporting set indicated for the CSI report may be used by the relay UE 910 to determine one or more transmission parameters.

The relay UE 910 may receive communications (e.g., data, control information, and/or the like) intended for the UE 905 from the base station 110, and relay the communications (e.g., data, control information, and/or the like) to the UE 905 via the sidelink channel using the transmission parameters determined based at least in part on the values of the CSI parameters in the SL CSI report. The relay UE 910 may receive communications (e.g., data, control information, and/or the like) transmitted by the UE 905 via the sidelink channel using the transmission parameters determined based at least in part on the values of the CSI parameters in the SL CSI report, and relay the communications (e.g., data, control information, and/or the like) to the base station 110.

Using the CSI reporting set configuration procedure described in connection with FIG. 9 enables the base station 110 to configure multiple different CSI reporting sets with different combinations of CSI parameters for the UE 905 to report depending on the destination and/or purpose of the CSI report. As a result, the UE 905 may report a particular combination of CSI parameters corresponding to the destination and/or purpose of the CSI report and thus conserve computing resources, networking resources, and/or the like that would otherwise have been consumed by the UE 905 to calculate and report all CSI parameters regardless of the destination and/or purpose of the CSI report.

As indicated above, FIG. 9 is provided as an example. Other examples may differ from what is described with respect to FIG. 9.

Figure 10:
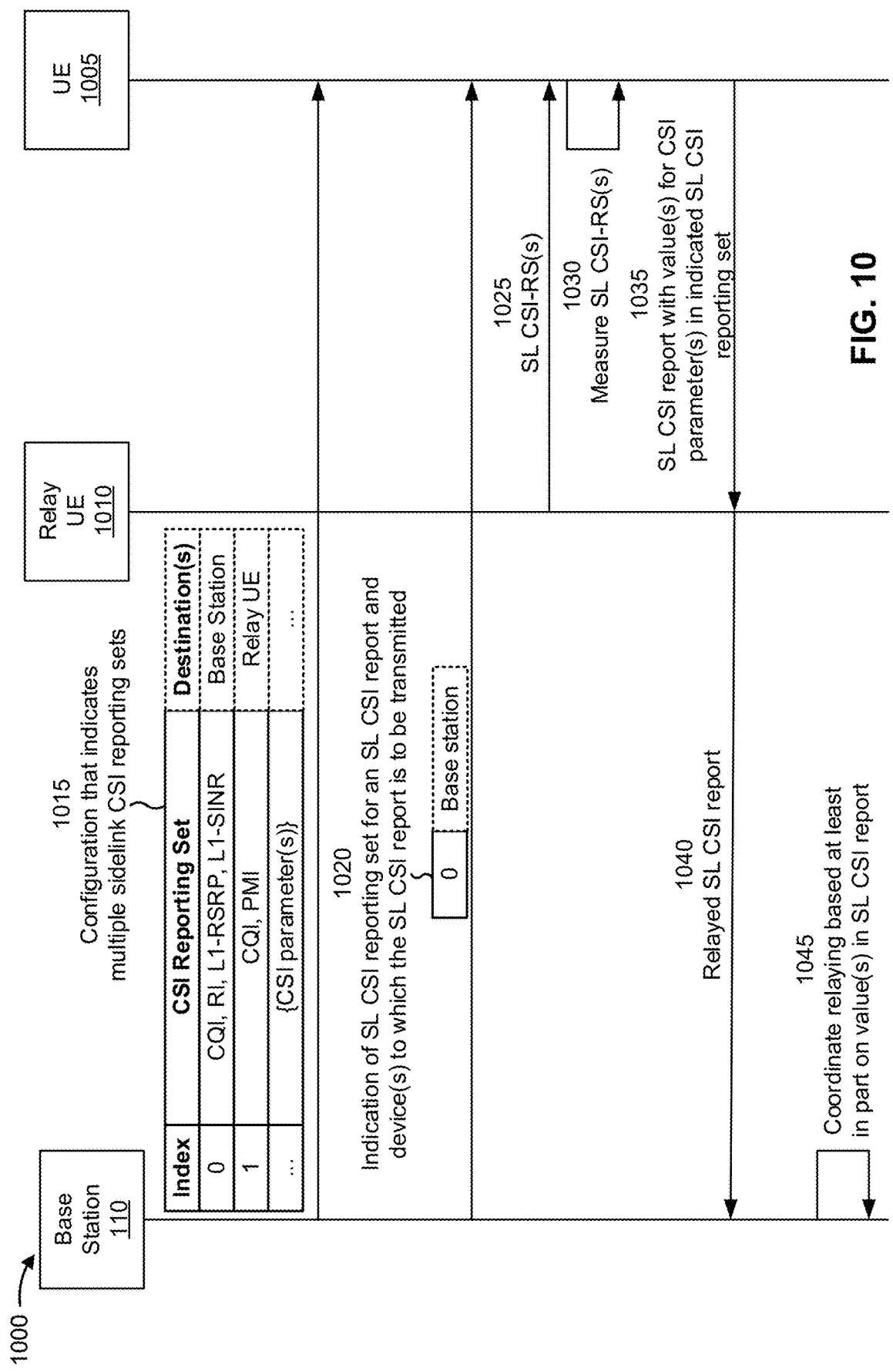
FIG. 10 is a diagram illustrating another example associated with sidelink channel state information reporting for sidelink relaying, in accordance with the present disclosure.

FIG. 10 is a diagram illustrating an example 1000 associated with sidelink channel state information reporting for sidelink relaying, in accordance with the present disclosure. As shown in FIG. 10, a base station 110, a UE 1005, and a relay UE 1010 may communicate with one another. The UE 1005 and the relay UE 1010 may communicate with one another via a sidelink. The base station 110 and the relay UE 1010 may communicate with one another via an access link. The UE 1005 and the base station 110 may communicate with one another via a direct link (e.g., an access link, such as when communications between the UE 1005 and the base station 110 are not relayed by the relay UE 1010) and/or via an indirect link (e.g., an access link and a sidelink, such as when communications between the UE 1005 and the base station 110 are relayed by the relay UE 1010). In some aspects, the UE 1005 and/or the relay UE 1010 may be a UE described elsewhere herein in connection with FIGS. 1-8. For example, the relay UE 1010 may be configured to relay communications between the base station 110 and the UE 1005. In some aspects, the relay UE 1010 provides a layer 2 relay service for the UE 1005, as described above in connection with FIG. 7. In example 1000, the relay UE 1010 may be a Tx UE and the UE 1005 may be an Rx UE, or the relay UE 1010 may be an Rx UE and the UE 1005 may be a Tx UE. In some aspects, the relay UE 1010 may be one of multiple relays that are used to perform multi-TRP sidelink relaying, as described above in connection with FIG. 8.

As shown by reference number 1015, the base station 110 may transmit (e.g., using controller/processor 240, transmission component 1404, and/or the like) a configuration that indicates multiple SL CSI reporting sets to the UE 1005. The different SL CSI reporting sets in the configuration include different combinations of CSI parameters. In some aspects, the base station 110 may transmit the configuration and the configuration may identify the SL CSI reporting sets, indexes, and/or destinations as described above in connection with FIG. 9.

As shown by reference number 1020, the base station 110 may transmit (e.g., using controller/processor 240, transmission component 1404, and/or the like), to the UE 1005, an indication of an SL reporting set for an SL CSI report and one or more destination devices (e.g., wireless communication devices, such as base station 110, relay UE 1010, and/or the like) to which the SL CSI report is to be transmitted. The base station 110 may transmit the indication of the SL CSI reporting set and the one or more destination devices directly to the UE 1005 in a PDCCH communication, a MAC control element, and/or the like. Additionally, and/or alternatively, the base station 110 may transmit the indication to the relay UE 1010, which may then relay the indication to the UE 1005.

The indication of the SL CSI reporting set may include an index value that corresponds to a respective CSI reporting set in the configuration. The index value indicates that the UE 1005 is to use the corresponding SL CSI reporting set for the SL CSI report. For example, as shown in FIG. 10, the indication includes an index value of 0, which corresponds to a first SL CSI reporting set (CQI, RI, L1-RSRP, L1-SINR) in the configuration.

The indication transmitted by the base station 110 may also include an indication of one or more destination devices to which the SL CSI report is to be transmitted. The indication may indicate to the UE 1005 to send the SL CSI report to the base station 110, a relay UE (e.g., relay UE 1010) that relays communications between the UE 1005 and the base station 110, a relay UE (e.g., relay UE 1010) from which sidelink CSI-RSs for the sidelink CSI report are received, a combination thereof, and/or the like. For example, the indication may indicate to the UE 1005 whether to send the SL CSI report to the base station 110 (e.g., through a Uu link) or to the relay UE 1010 (or another relay UE) via an SL communication. In the example shown in FIG. 10, the destination for the SL CSI report is the base station 110.

The indication of one or more destination devices for the SL CSI report may be a single bit that provides an indication that corresponds to a particular wireless communication device and/or a particular set of wireless communications devices. For example, the indication may be a single bit that indicates that the destination device(s) is/are one of the base station 110, the relay UE 1010, or the base station 110 and the relay UE 1010.

In some aspects, the indication transmitted by the base station 110 may include a first indication of the SL CSI reporting set for the SL CSI report and a second indication of the one or more destination devices for the SL CSI report. For example, a first index may provide the indication of the SL CSI reporting set and a second index may provide an indication of the one or more destination devices. In the example shown FIG. 10, first and second index values of 0, 0 may provide indications to the UE 1005 that the first SL CSI reporting set (CQI, RI, L1-RSRP, L1-SINR) is to be used for the SL CSI report and the SL CSI report is to be transmitted to the base station 110.

In some aspects, a single index may provide an indication of both the SL CSI reporting set and the one or more destination devices for the SL CSI report. In this case, the configuration may include corresponding destinations for the SL CSI reporting sets. Accordingly, the index that provides the indication of the SL CSI reporting set also provides the indication that the destination(s) associated with the SL CSI reporting set is the destination to which the SL CSI report is to be transmitted. For example, in the example shown in FIG. 10, the index value of 0 may provide an indication to the UE 1005 that the first SL CSI reporting set is to be used for the SL CSI report and that the SL CSI report is to be transmitted to the base station 110.

As shown by reference number 1025, the relay UE 1010 may transmit (e.g., using controller/processor 280 and/or the like), to the UE 1005, one or more SL CSI-RSs. As shown in FIG. 10, the relay UE 1010 transmits the SL CSI-RS(s) on a sidelink channel to the UE 1005. The relay UE 1010 may transmit the SL CSI-RS(s) to the UE 1005 based at least in part on receiving an SL CSI triggering message from the base station 110.

As shown by reference number 1030, based at least in part on receiving the SL CSI-RS(s) transmitted by the relay UE 1010, the UE 1005 may measure (e.g., using controller/processor 280, measurement component 1308, and/or the like) the SL CSI-RS(s) transmitted by the relay UE 1010 (e.g., on the sidelink channel). Based at least in part on measuring the SL CSI-RS(s), the UE 1005 may calculate, for the sidelink channel, the CSI parameters included in the SL CSI reporting set indicated for the SL CSI report. In the example shown in FIG. 10, the indication from the base station 110 indicates that the first CSI reporting set (CQI, RI, L1-RSRP, L1-SINR) is to be used for the SL CSI report. Thus, in the example of FIG. 10, the UE 1005 may calculate a CQI value, an RI value, an L1-RSRP value, and an L1-SINR value based at least in part on measuring the SL CSI-RS(s). In some aspects, the UE 1005 may calculate only the CSI parameters included in the SL CSI reporting set indicated for the SL CSI report. In some aspects, the UE 1005 may calculate one or more other CSI parameters in addition to the CSI parameters included in the SL CSI reporting set indicated for the SL CSI report, but the one or more other CSI parameters may not be included in the SL CSI report.

As shown by reference number 1035, based at least in part on measuring the SL CSI-RS(s), the UE 1005 may transmit (e.g., using controller/processor 280, transmission component 1304, and/or the like) an SL CSI report to the relay UE 1010 for the CSI parameters in the indicated SL CSI reporting set. The SL CSI report may include values, calculated by the UE 1005, for the CSI parameters included in the indicated SL CSI reporting set. In the example shown in FIG. 10, the indication from the base station 110 indicates that the first CSI reporting set (CQI, RI, L1-RSRP, L1-SINR) is to be used for the CSI report. Thus, in the example of FIG. 10, the SL CSI report may include the CQI value, the RI value, the L1-RSRP value, and the L1-SINR value calculated by the UE 1005 based at least in part on measuring the SL CSI-RS(s).

As shown by reference number 1040, the relay UE 1010 relays (e.g., using controller/processor 280 and/or the like) the SL CSI report to the base station 110. The indication received from the UE 1005 from the base station 110 may indicate one or more destinations to which the SL CSI report is to be transmitted. In the example of FIG. 10, the indication from the base station 110 indicates that the destination for the SL CSI report is the base station 110. As shown in FIG. 10, the UE 1005 may transmit the SL CSI report to the relay UE 1010 on a sidelink channel and the relay UE 1010 transmits the SL CSI report to the base station 110 via an access link (e.g., Uu link) communication. Additionally, and/or alternatively, the UE 1005 may transmit the SL CSI report directly to the base station 110 via an access link (Uu link) communication.

As shown by reference number 1045, the base station 110 may coordinate (e.g., using controller/processor 240, identification component 1408, and/or the like) relaying based at least in part on the values of the CSI parameters in the SL CSI report transmitted from the UE 1005 (via the relay UE 1010). For example, the base station 110 may select one or more sidelinks/relay UEs (e.g., relay UE 1010 and/or other relay UEs) to use for relaying communications (e.g., data, control information, and/or the like) to and/or from the UE 1005, schedule and/or control relay communications, allocate resources for relay UEs (e.g., relay UE 1010 and/or other relay UEs) to use for sidelink communications, and/or the like based at least in part on the values of the CSI parameters in the SL CSI report.

In the example of FIG. 10, the SL CSI report received by the base station 110 includes a CQI value, an RI value, an L1-RSRP value, and an L1-SINR value. In some aspects, the base station 110 may select one or more relay sidelinks/UEs (e.g., relay UE 1010 and/or other relay UEs) to use for relaying communications to and/or from the UE 1005, schedule and/or control relay communications to and/or from the UE 1005, allocate resources for relay UEs (e.g., relay UE 1010 and/or other relay UEs) to use for sidelink communications, and/or the like, based at least in part on the CQI value, the RI value, the L1-RSRP value, the L1-SINR value, and/or a combination thereof. For example, the base station 110 may select a sidelink to perform relaying for communications to and/or from the UE 1005 based at least in part on the L1-RSRP value and the L1-SINR value.

Using the CSI reporting set configuration procedure described in connection with FIG. 10 enables the base station 110 to configure multiple different CSI reporting sets with different combinations of CSI parameters for the UE 1005 to report depending on the destination and/or purpose of the CSI report. As a result, the UE 1005 may report a particular combination of CSI parameters corresponding to the destination and/or purpose of the CSI report and thus conserve computing resources, networking resources, and/or the like that would otherwise have been consumed by the UE 1005 to calculate and report all CSI parameters regardless of the destination and/or purpose of the CSI report.

As indicated above, FIG. 10 is provided as an example. Other examples may differ from what is described with respect to FIG. 10.

Figure 11:
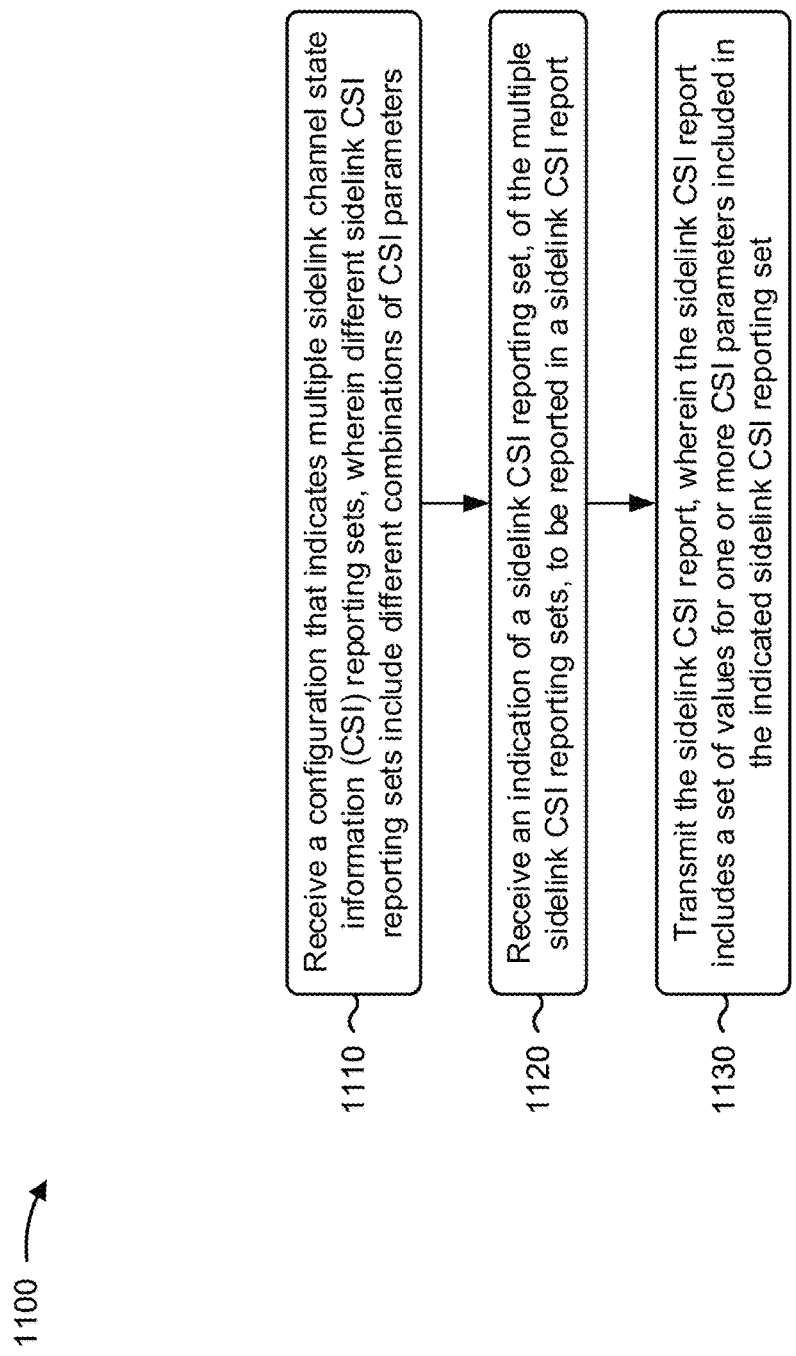
FIG. 11 is a diagram illustrating an example process performed, for example, by a UE, in accordance with the present disclosure.

FIG. 11 is a diagram illustrating an example process 1100 performed, for example, by a UE, in accordance with the present disclosure. Example process 1100 is an example where the UE (e.g., UE 120, UE 905, UE 1005, and/or the like) performs operations associated with sidelink channel state information reporting for sidelink relaying that uses multiple transmit receive points.

As shown in FIG. 11, in some aspects, process 1100 may include receiving a configuration that indicates multiple sidelink CSI reporting sets, wherein different sidelink CSI reporting sets include different combinations of CSI parameters (block 1110). For example, the UE (e.g., using receive processor 258, transmit processor 264, controller/processor 280, memory 282, and/or the like) may receive a configuration that indicates multiple sidelink CSI reporting sets, as described above, for example, with reference to FIGS. 9 and/or 10. In some aspects, different sidelink CSI reporting sets include different combinations of CSI parameters.

As further shown in FIG. 11, in some aspects, process 1100 may include receiving an indication of a sidelink CSI reporting set, of the multiple sidelink CSI reporting sets, to be reported in a sidelink CSI report (block 1120). For example, the UE (e.g., using receive processor 258, transmit processor 264, controller/processor 280, memory 282, and/or the like) may receive an indication of a sidelink CSI reporting set, of the multiple sidelink CSI reporting sets, to be reported in a sidelink CSI report, as described above, for example, with reference to FIGS. 9 and/or 10.

As further shown in FIG. 11, in some aspects, process 1100 may include transmitting the sidelink CSI report, wherein the sidelink CSI report includes a set of values for one or more CSI parameters included in the indicated sidelink CSI reporting set (block 1130). For example, the UE (e.g., using receive processor 258, transmit processor 264, controller/processor 280, memory 282, and/or the like) may transmit the sidelink CSI, as described above, for example, with reference to FIGS. 9 and/or 10. In some aspects, the sidelink CSI report includes a set of values for one or more CSI parameters included in the indicated sidelink CSI reporting set.

Process 1100 may include additional aspects, such as any single aspect or any combination of aspects described below and/or in connection with one or more other processes described elsewhere herein.

In a first aspect, process 1100 includes receiving an indication of one or more wireless communication devices that are a destination for the sidelink CSI report. In a second aspect, alone or in combination with the first aspect, the sidelink CSI report is transmitted directly or indirectly to the one or more wireless communication devices. In a third aspect, alone or in combination with one or more of the first and second aspects, the one or more wireless communication devices include a base station, a relay UE that relays communications between the UE and the base station, a relay UE from which sidelink CSI reference signals for the sidelink CSI report are received, or a combination thereof.

In a fourth aspect, alone or in combination with one or more of the first through third aspects, the indication of the one or more wireless communication devices is a single bit that indicates one of: a relay UE or a base station, or the relay UE or both the relay UE and the base station.

In a fifth aspect, alone or in combination with one or more of the first through fourth aspects, the sidelink CSI reporting set includes one or more of a channel quality indicator parameter, a precoding matrix indicator parameter, a CSI reference signal resource indicator parameter, a layer indicator parameter, a rank indicator parameter, a layer 1 reference signal received power parameter, a layer 1 signal-to-interference-plus-noise ratio parameter, or a combination thereof.

In a sixth aspect, alone or in combination with one or more of the first through fifth aspects, the indication of the sidelink CSI reporting set is received in a physical downlink control channel communication from a base station, a medium access control (MAC) control element from the base station, a message from a relay UE, or a combination thereof.

In a seventh aspect, alone or in combination with one or more of the first through sixth aspects, a first sidelink CSI reporting set, of the multiple sidelink CSI reporting sets, includes a channel quality indicator parameter, a rank indicator parameter, a layer 1 reference signal received power parameter, and a layer 1 signal-to-interference-plus-noise ratio parameter. In an eighth aspect, alone or in combination with one or more of the first through seventh aspects the CSI report is destined for a base station.

In a ninth aspect, alone or in combination with one or more of the first through eighth aspects, a second sidelink CSI reporting set, of the multiple sidelink CSI reporting sets, includes a channel quality indicator parameter and a precoding matrix indicator parameter. In a tenth aspect, alone or in combination with one or more of the first through ninth aspects the CSI report is destined for a relay UE and not a base station.

In an eleventh aspect, alone or in combination with one or more of the first through tenth aspects, the configuration indicates a mapping between sidelink CSI reporting sets, of the multiple sidelink CSI reporting sets, and corresponding index values, and the indication of the sidelink CSI reporting set includes an index value of the corresponding index values. In a twelfth aspect, alone or in combination with one or more of the first through eleventh aspects, the sidelink CSI report is for millimeter wave communications.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
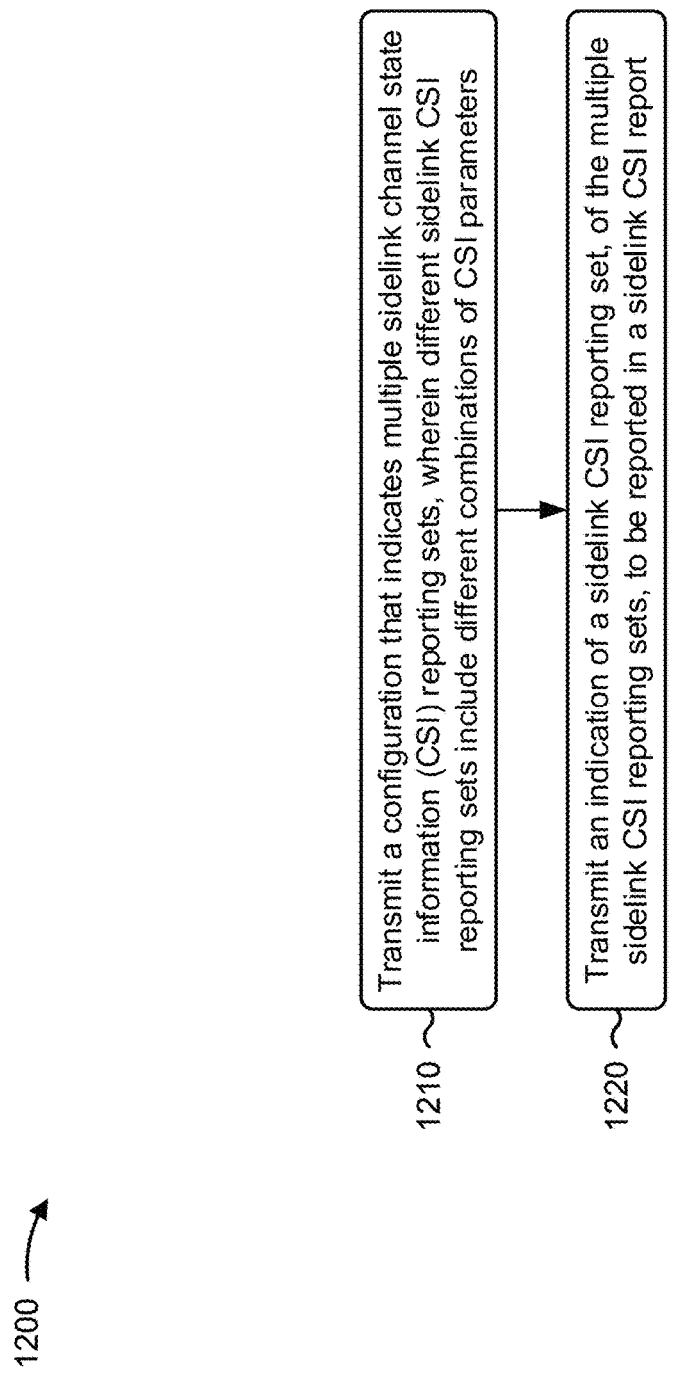
FIG. 12 is a diagram illustrating an example process performed, for example, by a base station, in accordance with the present disclosure.

FIG. 12 is a diagram illustrating an example process 1200 performed, for example, by a base station, in accordance with the present disclosure. Example process 1200 is an example where the base station (e.g., base station 110 and/or the like) performs operations associated with sidelink channel state information reporting for sidelink relaying that uses multiple transmit receive points.

As shown in FIG. 12, in some aspects, process 1200 may include transmitting a configuration that indicates multiple sidelink CSI reporting sets, wherein different sidelink CSI reporting sets include different combinations of CSI parameters (block 1210). For example, the base station (e.g., using transmit processor 220, receive processor 238, controller/processor 240, memory 242, and/or the like) may transmit a configuration that indicates multiple sidelink CSI reporting sets, as described above, for example, with reference to FIGS. 9 and/or 10. In some aspects, different sidelink CSI reporting sets include different combinations of CSI parameters.

As further shown in FIG. 12, in some aspects, process 1200 may include transmitting an indication of a sidelink CSI reporting set, of the multiple sidelink CSI reporting sets, to be reported in a sidelink CSI report (block 1220). For example, the base station (e.g., using transmit processor 220, receive processor 238, controller/processor 240, memory 242, and/or the like) may transmit an indication of a sidelink CSI reporting set, of the multiple sidelink CSI reporting sets, to be reported in a sidelink CSI report, as described above, for example, with reference to FIGS. 9 and/or 10.

Process 1200 may include additional aspects, such as any single aspect or any combination of aspects described below and/or in connection with one or more other processes described elsewhere herein.

In a first aspect, process 1200 includes receiving the sidelink CSI report, wherein the sidelink CSI report includes a set of values for one or more CSI parameters included in the indicated sidelink CSI reporting set. In a second aspect, alone or in combination with the first aspect, process 1200 includes identifying a sidelink to be used for communication between a user equipment (UE) and a relay UE based at least in part on the CSI report; and communicating with the UE via the identified sidelink.

In a third aspect, alone or in combination with one or more of the first and second aspects, process 1200 includes transmitting an indication of one or more wireless communication devices that are a destination for the sidelink CSI report. In a fourth aspect, alone or in combination with one or more of the first through third aspects, the one or more wireless communication devices include the base station, a relay UE that relays communications between the UE and the base station, a relay UE from which sidelink CSI reference signals for the sidelink CSI report are received, or a combination thereof.

In a fifth aspect, alone or in combination with one or more of the first through fourth aspects, the indication of the one or more wireless communication devices is a single bit that indicates one of: a relay UE or the base station, or the relay UE or both the relay UE and the base station.

In a sixth aspect, alone or in combination with one or more of the first through fifth aspects, the sidelink CSI reporting set includes one or more of a channel quality indicator parameter, a precoding matrix indicator parameter, a CSI reference signal resource indicator parameter, a layer indicator parameter, a rank indicator parameter, a layer 1 reference signal received power parameter, a layer 1 signal-to-interference-plus-noise ratio parameter, or a combination thereof.

In a seventh aspect, alone or in combination with one or more of the first through sixth aspects, the indication of the sidelink CSI reporting set is transmitted in a physical downlink control channel communication, a medium access control (MAC) control element, or a combination thereof.

In an eighth aspect, alone or in combination with one or more of the first through seventh aspects, a first sidelink CSI reporting set, of the multiple sidelink CSI reporting sets, includes a channel quality indicator parameter, a rank indicator parameter, a layer 1 reference signal received power parameter, and a layer 1 signal-to-interference-plus-noise ratio parameter. In a ninth aspect, alone or in combination with one or more of the first through eighth aspects the CSI report is destined for the base station.

In a tenth aspect, alone or in combination with one or more of the first through ninth aspects, a second sidelink CSI reporting set, of the multiple sidelink CSI reporting sets, includes a channel quality indicator parameter and a precoding matrix indicator parameter. In an eleventh aspect, alone or in combination with one or more of the first through tenth aspects the CSI report is destined for a relay UE and not a base station.

In a twelfth aspect, alone or in combination with one or more of the first through eleventh aspects, the configuration indicates a mapping between sidelink CSI reporting sets, of the multiple sidelink CSI reporting sets, and corresponding index values, and the indication of the sidelink CSI reporting set includes an index value of the corresponding index values. In a thirteenth aspect, alone or in combination with one or more of the first through twelfth aspects, the sidelink CSI report is for millimeter wave communications.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
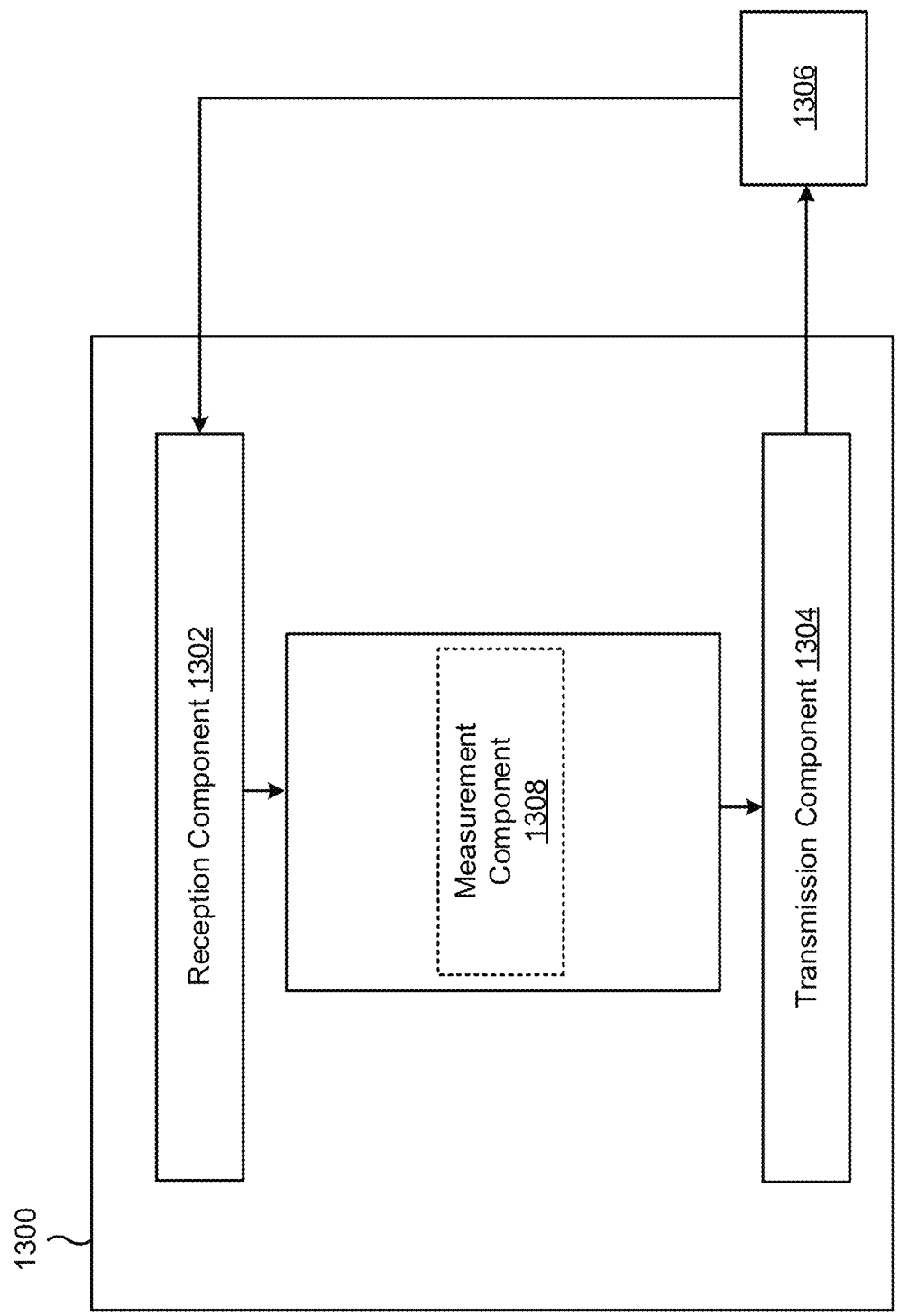
FIGS. 13-14 are block diagrams of example apparatuses for wireless communication, in accordance with the present disclosure.

FIG. 13 is a block diagram of an example apparatus 1300 for wireless communication, in accordance with the present disclosure. The apparatus 1300 may be a UE, or a UE may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, or another wireless communication device) using the reception component 1302 and the transmission component 1304. As further shown, the apparatus 1300 may include one or more other components including, for example, a measurement component 1308.

In some aspects, the apparatus 1300 may be configured to perform one or more operations described herein in connection with FIGS. 9-10. Additionally, or alternatively, the apparatus 1300 may be configured to perform one or more processes described herein, such as process 1100 of FIG. 11. In some aspects, the apparatus 1300 and/or one or more components shown in FIG. 13 may include one or more components of the UE described above in connection with FIG. 2. Additionally, or alternatively, one or more components shown in FIG. 13 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1306. In some aspects, the reception component 1302 may include one or more antennas, a demodulator, a MIMO detector, a receive processor, a controller/processor, a memory, or a combination thereof, of the UE described above in connection with FIG. 2.

The transmission component 1304 may transmit communications, such as reference signals, control information, data communications, or a combination thereof, to the apparatus 1306. In some aspects, one or more other components of the apparatus 1306 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modulator, a transmit MIMO processor, a transmit processor, a controller/processor, a memory, or a combination thereof, of the UE described above in connection with FIG. 2. In some aspects, the transmission component 1304 may be collocated with the reception component 1302 in a transceiver.

The reception component 1302 may receive a configuration that indicates multiple sidelink CSI reporting sets, wherein different sidelink CSI reporting sets include different combinations of CSI parameters. The reception component may receive an indication of a sidelink CSI reporting set, of the multiple sidelink CSI reporting sets, to be reported in a sidelink CSI report. The measurement component 1308 may measure a CSI-RS to calculate a set of values for one or more CSI parameters included in the indicated sidelink CSI computing set. The transmission component 1304 may transmit the sidelink CSI, wherein the sidelink CSI report includes the set of values for the one or more CSI parameters included in the indicated sidelink CSI reporting set.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally or alternatively, a set of (one or more) components shown in FIG. 13 may perform one or more functions described as being performed by another set of components shown in FIG. 13.

Figure 14:
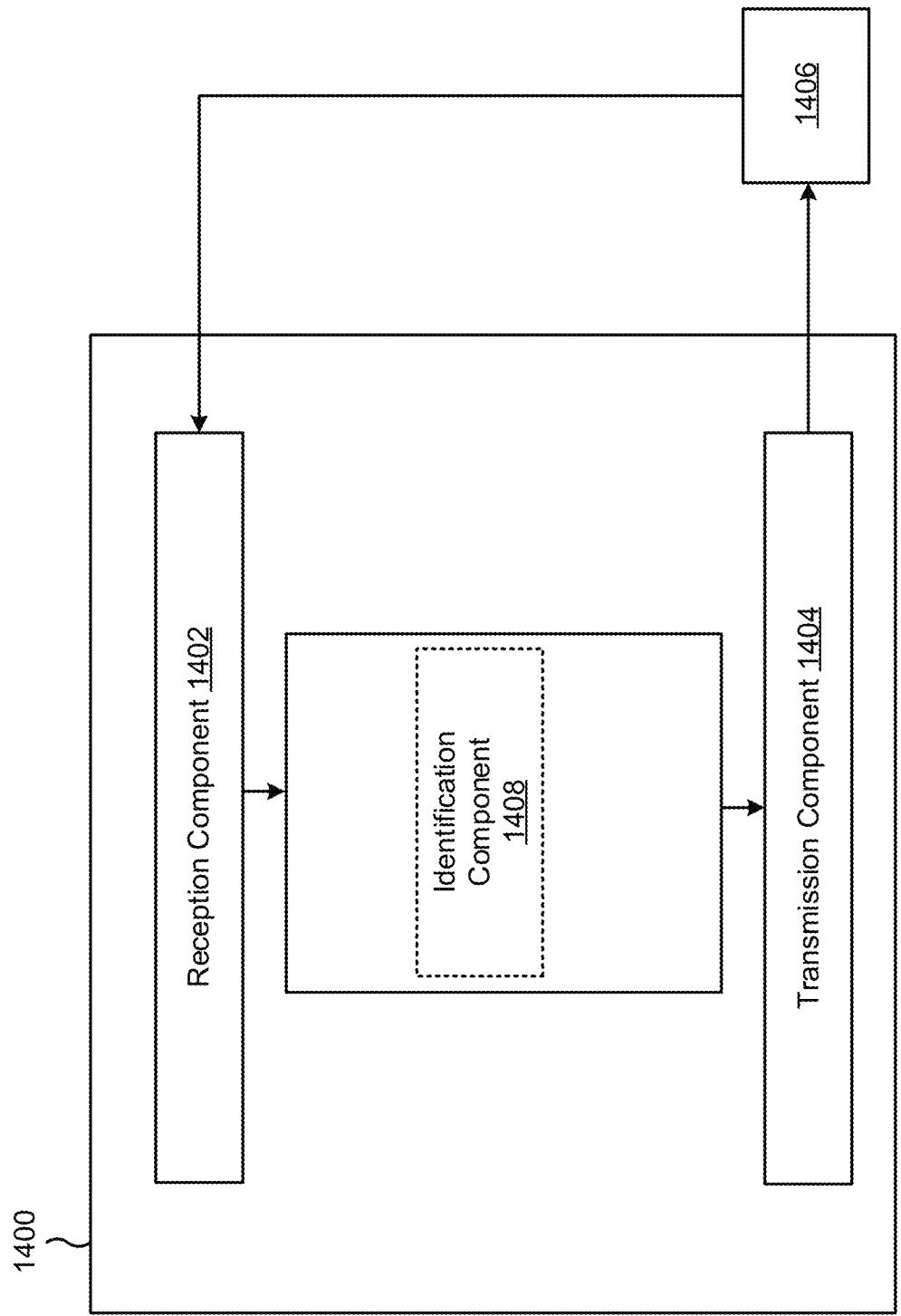

FIG. 14 is a block diagram of an example apparatus 1400 for wireless communication, in accordance with the present disclosure. The apparatus 1400 may be a base station, or a base station may include the apparatus 1400. In some aspects, the apparatus 1400 includes a reception component 1402 and a transmission component 1404, which may be in communication with one another (for example, via one or more buses and/or one or more other components). As shown, the apparatus 1400 may communicate with another apparatus 1406 (such as a UE, a base station, or another wireless communication device) using the reception component 1402 and the transmission component 1404. As further shown, the apparatus 1400 may include one or more components including, for example, an identification component 1408.

In some aspects, the apparatus 1400 may be configured to perform one or more operations described herein in connection with FIGS. 9-10. Additionally, or alternatively, the apparatus 1400 may be configured to perform one or more processes described herein, such as process 1200 of FIG. 12. In some aspects, the apparatus 1400 and/or one or more components shown in FIG. 14 may include one or more components of the base station described above in connection with FIG. 2. Additionally, or alternatively, one or more components shown in FIG. 14 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1402 may receive communications, such as reference signals, control information, data communications, or a combination thereof, from the apparatus 1406. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1406. In some aspects, the reception component 1402 may include one or more antennas, a demodulator, a MIMO detector, a receive processor, a controller/processor, a memory, or a combination thereof, of the base station described above in connection with FIG. 2.

The transmission component 1404 may transmit communications, such as reference signals, control information, data communications, or a combination thereof, to the apparatus 1406. In some aspects, one or more other components of the apparatus 1406 may generate communications and may provide the generated communications to the transmission component 1404 for transmission to the apparatus 1406. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1406. In some aspects, the transmission component 1404 may include one or more antennas, a modulator, a transmit MIMO processor, a transmit processor, a controller/processor, a memory, or a combination thereof, of the base station described above in connection with FIG. 2. In some aspects, the transmission component 1404 may be collocated with the reception component 1402 in a transceiver.

The transmission component 1404 may transmit a configuration that indicates multiple sidelink CSI reporting sets, wherein different sidelink CSI reporting sets include different combinations of CSI parameters. The transmission component 1404 may transmit an indication of a sidelink CSI reporting set, of the multiple sidelink CSI reporting sets, to be reported in a sidelink CSI report. The reception component 1402 may receiving the sidelink CSI report, wherein the sidelink CSI report includes a set of values for one or more CSI parameters included in the indicated sidelink CSI reporting set. The identification component 1408 may identify a sidelink to be used for communication between a user equipment (UE) and a relay UE based at least in part on the CSI report.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally, or alternatively, a set of (one or more) components shown in FIG. 14 may perform one or more functions described as being performed by another set of components shown in FIG. 14.

The following provides an overview of some Aspects of the present disclosure:

Aspect 1: A method of wireless communication performed by a user equipment (UE), comprising: receiving a configuration that indicates multiple sidelink channel state information (CSI) reporting sets, wherein different sidelink CSI reporting sets include different combinations of CSI parameters; receiving an indication of a sidelink CSI reporting set, of the multiple sidelink CSI reporting sets, to be reported in a sidelink CSI report; and transmitting the sidelink CSI report, wherein the sidelink CSI report includes a set of values for one or more CSI parameters included in the indicated sidelink CSI reporting set.

Aspect 2: The method of Aspect 1, further comprising receiving an indication of one or more wireless communication devices that are a destination for the sidelink CSI report.

Aspect 3: The method of Aspect 2, wherein the sidelink CSI report is transmitted directly or indirectly to the one or more wireless communication devices.

Aspect 4: The method of any of Aspects 2-3, wherein the one or more wireless communication devices include a base station, a relay UE that relays communications between the UE and the base station, a relay UE from which sidelink CSI reference signals for the sidelink CSI report are received, or a combination thereof.

Aspect 5: The method of any of Aspects 2-4, wherein the indication of the one or more wireless communication devices is a single bit that indicates one of: a relay UE or a base station, or the relay UE or both the relay UE and the base station.

Aspect 6: The method of any of Aspects 1-5, wherein the sidelink CSI reporting set includes one or more of a channel quality indicator parameter, a precoding matrix indicator parameter, a CSI reference signal resource indicator parameter, a layer indicator parameter, a rank indicator parameter, a layer 1 reference signal received power parameter, a layer 1 signal-to-interference-plus-noise ratio parameter, or a combination thereof.

Aspect 7: The method of any of Aspects 1-6, wherein the indication of the sidelink CSI reporting set is received in a physical downlink control channel communication from a base station, a medium access control (MAC) control element from the base station, a message from a relay UE, or a combination thereof.

Aspect 8: The method of any of Aspects 1-7, wherein a first sidelink CSI reporting set, of the multiple sidelink CSI reporting sets, includes a channel quality indicator parameter, a rank indicator parameter, a layer 1 reference signal received power parameter, and a layer 1 signal-to-interference-plus-noise ratio parameter.

Aspect 9: The method of Aspect 8, wherein the CSI report is destined for a base station.

Aspect 10: The method of any of Aspects 1-9, wherein a second sidelink CSI reporting set, of the multiple sidelink CSI reporting sets, includes a channel quality indicator parameter and a precoding matrix indicator parameter.

Aspect 11: The method of Aspect 10, wherein the CSI report is destined for a relay UE and not a base station.

Aspect 12: The method of any of Aspects 1-11, wherein the configuration indicates a mapping between sidelink CSI reporting sets, of the multiple sidelink CSI reporting sets, and corresponding index values, and wherein the indication of the sidelink CSI reporting set includes an index value of the corresponding index values.

Aspect 13: The method of any of Aspects 1-12, wherein the sidelink CSI report is for millimeter wave communications.

Aspect 14: A method of wireless communication performed by a base station, comprising: transmitting a configuration that indicates multiple sidelink channel state information (CSI) reporting sets, wherein different sidelink CSI reporting sets include different combinations of CSI parameters; and transmitting an indication of a sidelink CSI reporting set, of the multiple sidelink CSI reporting sets, to be reported in a sidelink CSI report.

Aspect 15: The method of Aspect 14, further comprising receiving the sidelink CSI report, wherein the sidelink CSI report includes a set of values for one or more CSI parameters included in the indicated sidelink CSI reporting set.

Aspect 16: The method of Aspect 15, further comprising: identifying a sidelink to be used for communication between a user equipment (UE) and a relay UE based at least in part on the sidelink CSI report; and communicating with the UE via the identified sidelink.

Aspect 17: The method of any of Aspects 14-16, further comprising transmitting an indication of one or more wireless communication devices that are a destination for the sidelink CSI report.

Aspect 18: The method of Aspect 17, wherein the one or more wireless communication devices include the base station, a relay UE that relays communications between the UE and the base station, a relay UE from which sidelink CSI reference signals for the sidelink CSI report are received, or a combination thereof.

Aspect 19: The method of any of Aspects 17-18, wherein the indication of the one or more wireless communication devices is a single bit that indicates one of: a relay UE or the base station, or the relay UE or both the relay UE and the base station.

Aspect 20: The method of any of Aspects 14-19, wherein the sidelink CSI reporting set includes one or more of a channel quality indicator parameter, a precoding matrix indicator parameter, a CSI reference signal resource indicator parameter, a layer indicator parameter, a rank indicator parameter, a layer 1 reference signal received power parameter, a layer 1 signal-to-interference-plus-noise ratio parameter, or a combination thereof.

Aspect 21: The method of any of Aspects 14-20, wherein the indication of the sidelink CSI reporting set is transmitted in a physical downlink control channel communication, a medium access control (MAC) control element, or a combination thereof.

Aspect 22: The method of any of Aspects 14-21, wherein a first sidelink CSI reporting set, of the multiple sidelink CSI reporting sets, includes a channel quality indicator parameter, a rank indicator parameter, a layer 1 reference signal received power parameter, and a layer 1 signal-to-interference-plus-noise ratio parameter.

Aspect 23: The method of Aspect 22, wherein the sidelink CSI report is destined for the base station.

Aspect 24: The method of any of Aspects 14-23, wherein a second sidelink CSI reporting set, of the multiple sidelink CSI reporting sets, includes a channel quality indicator parameter and a precoding matrix indicator parameter.

Aspect 25: The method of Aspect 24, wherein the sidelink CSI report is destined for a relay UE and not a base station.

Aspect 26: The method of any of Aspects 14-25, wherein the configuration indicates a mapping between sidelink CSI reporting sets, of the multiple sidelink CSI reporting sets, and corresponding index values, and wherein the indication of the sidelink CSI reporting set includes an index value of the corresponding index values.

Aspect 27: The method of any of Aspects 14-26, wherein the sidelink CSI report is for millimeter wave communications.

Aspect 28: An apparatus for wireless communication at a device, comprising a processor; memory coupled with the processor; and instructions stored in the memory and executable by the processor to cause the apparatus to perform the method of one or more of Aspects 1-13.

Aspect 29: A device for wireless communication, comprising a memory and one or more processors coupled to the memory, the memory and the one or more processors configured to perform the method of one or more of Aspects 1-13.

Aspect 30: An apparatus for wireless communication, comprising at least one means for performing the method of one or more of Aspects 1-13.

Aspect 31: A non-transitory computer-readable medium storing code for wireless communication, the code comprising instructions executable by a processor to perform the method of one or more of Aspects 1-13.

Aspect 32: A non-transitory computer-readable medium storing a set of instructions for wireless communication, the set of instructions comprising one or more instructions that, when executed by one or more processors of a device, cause the device to perform the method of one or more of Aspects 1-13.

Aspect 33: An apparatus for wireless communication at a device, comprising a processor; memory coupled with the processor; and instructions stored in the memory and executable by the processor to cause the apparatus to perform the method of one or more of Aspects 14-27.

Aspect 34: A device for wireless communication, comprising a memory and one or more processors coupled to the memory, the memory and the one or more processors configured to perform the method of one or more of Aspects 14-27.

Aspect 35: An apparatus for wireless communication, comprising at least one means for performing the method of one or more of Aspects 14-27.

Aspect 36: A non-transitory computer-readable medium storing code for wireless communication, the code comprising instructions executable by a processor to perform the method of one or more of Aspects 14-27.

Aspect 37: A non-transitory computer-readable medium storing a set of instructions for wireless communication, the set of instructions comprising one or more instructions that, when executed by one or more processors of a device, cause the device to perform the method of one or more of Aspects 14-27.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
    receiving a configuration that indicates multiple sidelink channel state information (CSI) reporting sets, wherein different sidelink CSI reporting sets include different combinations of CSI parameters, and wherein the different sidelink CSI reporting sets are associated with one or more different destinations;
    receiving an indication of a sidelink CSI reporting set, of the multiple sidelink CSI reporting sets, to be reported in a sidelink CSI report; and
    transmitting the sidelink CSI report to one or more destinations associated with the indicated sidelink CSI reporting set, the one or more destinations comprising one or more wireless communication devices, wherein the sidelink CSI report includes a set of values for one or more CSI parameters included in the indicated sidelink CSI reporting set.

2. The method of claim 1, further comprising receiving an indication of the one or more destinations for the indicated sidelink CSI reporting set.

3. The method of claim 2, wherein the sidelink CSI report is transmitted directly or indirectly to the one or more wireless communication devices.

4. The method of claim 2, wherein the one or more wireless communication devices include a network entity, a relay UE that relays communications between the UE and the network entity, a relay UE from which sidelink CSI reference signals for the sidelink CSI report are received, or a combination thereof.

5. The method of claim 2, wherein the indication of the one or more wireless communication devices is a single bit that indicates one of:
    a relay UE or a network entity, or
    the relay UE or both the relay UE and the network entity.

6. The method of claim 1, wherein the sidelink CSI reporting set includes one or more of a channel quality indicator parameter, a precoding matrix indicator parameter, a CSI reference signal resource indicator parameter, a layer indicator parameter, a rank indicator parameter, a layer 1 reference signal received power parameter, a layer 1 signal-to-interference-plus-noise ratio parameter, or a combination thereof.

7. The method of claim 1, wherein the indication of the sidelink CSI reporting set is received in a physical downlink control channel communication from a network entity, a medium access control (MAC) control element from the network entity, a message from a relay UE, or a combination thereof.

8. The method of claim 1, wherein a first sidelink CSI reporting set, of the multiple sidelink CSI reporting sets, includes a channel quality indicator parameter, a rank indicator parameter, a layer 1 reference signal received power parameter, and a layer 1 signal-to-interference-plus-noise ratio parameter.

9. The method of claim 8, wherein the CSI report is destined for a network entity.

10. The method of claim 1, wherein a second sidelink CSI reporting set, of the multiple sidelink CSI reporting sets, includes a channel quality indicator parameter and a precoding matrix indicator parameter.

11. The method of claim 10, wherein the CSI report is destined for a relay UE and not a network entity.

12. The method of claim 1, wherein the configuration indicates a mapping between sidelink CSI reporting sets, of the multiple sidelink CSI reporting sets, and corresponding index values, and wherein the indication of the sidelink CSI reporting set includes an index value of the corresponding index values.

13. The method of claim 1, wherein the sidelink CSI report is for millimeter wave communications.

14. A method of wireless communication performed by a network entity, comprising:
transmitting a configuration that indicates multiple sidelink channel state information (CSI) reporting sets, wherein different sidelink CSI reporting sets include different combinations of CSI parameters, and wherein the different sidelink CSI reporting sets are associated with one or more different destinations; and
transmitting an indication of a sidelink CSI reporting set, of the multiple sidelink CSI reporting sets, to be reported in a sidelink CSI report to one or more destinations associated with the indicated sidelink CSI reporting set, the one or more destinations comprising one or more wireless communication devices.

15. The method of claim 14, further comprising:
receiving the sidelink CSI report, wherein the sidelink CSI report includes a set of values for one or more CSI parameters included in the indicated sidelink CSI reporting set;
identifying a sidelink to be used for communication between a user equipment (UE) and a relay UE based at least in part on the sidelink CSI report; and
communicating with the UE via the identified sidelink.

16. The method of claim 14, further comprising transmitting an indication of the one or more destinations for the sidelink CSI reporting set, wherein the one or more wireless communication devices include the network entity, a relay UE that relays communications between a user equipment (UE) and the network entity, a relay UE from which sidelink CSI reference signals for the sidelink CSI report are received, or a combination thereof.

17. The method of claim 14, wherein the sidelink CSI reporting set includes one or more of a channel quality indicator parameter, a precoding matrix indicator parameter, a CSI reference signal resource indicator parameter, a layer indicator parameter, a rank indicator parameter, a layer 1 reference signal received power parameter, a layer 1 signal-to-interference-plus-noise ratio parameter, or a combination thereof.

18. The method of claim 14, wherein a first sidelink CSI reporting set, of the multiple sidelink CSI reporting sets, includes a channel quality indicator parameter, a rank indicator parameter, a layer 1 reference signal received power parameter, and a layer 1 signal-to-interference-plus-noise ratio parameter.

19. The method of claim 14, wherein a second sidelink CSI reporting set, of the multiple sidelink CSI reporting sets, includes a channel quality indicator parameter and a precoding matrix indicator parameter.

20. The method of claim 14, wherein the configuration indicates a mapping between sidelink CSI reporting sets, of the multiple sidelink CSI reporting sets, and corresponding index values, and wherein the indication of the sidelink CSI reporting set includes an index value of the corresponding index values.

21. A user equipment (UE) for wireless communication, comprising:
memory; and
one or more processors, coupled to the memory, configured to:
receive a configuration that indicates multiple sidelink channel state information (CSI) reporting sets, wherein different sidelink CSI reporting sets include different combinations of CSI parameters, and wherein the different sidelink CSI reporting sets are associated with one or more different destinations;
receive an indication of a sidelink CSI reporting set, of the multiple sidelink CSI reporting sets, to be reported in a sidelink CSI report; and
transmit the sidelink CSI report to one or more destinations associated with the indicated sidelink CSI reporting set, the one or more destinations comprising one or more wireless communication devices, wherein the sidelink CSI report includes a set of values for one or more CSI parameters included in the indicated sidelink CSI reporting set.

22. The UE of claim 21, wherein the one or more processors are further configured to receive an indication of the one or more destinations for the sidelink CSI reporting set.

23. The UE of claim 22, wherein the sidelink CSI report is transmitted directly or indirectly to the one or more wireless communication devices.

24. The UE of claim 22, wherein the one or more wireless communication devices include a network entity, a relay UE that relays communications between the UE and the network entity, a relay UE from which sidelink CSI reference signals for the sidelink CSI report are received, or a combination thereof.

25. The UE of claim 21, wherein the sidelink CSI reporting set includes one or more of a channel quality indicator parameter, a precoding matrix indicator parameter, a CSI reference signal resource indicator parameter, a layer indicator parameter, a rank indicator parameter, a layer 1 reference signal received power parameter, a layer 1 signal-to-interference-plus-noise ratio parameter, or a combination thereof.

26. The UE of claim 21, wherein the indication of the sidelink CSI reporting set is received in a physical downlink control channel communication from a network entity, a medium access control (MAC) control element from the network entity, a message from a relay UE, or a combination thereof.

27. The UE of claim 21, wherein a first sidelink CSI reporting set, of the multiple sidelink CSI reporting sets, includes a channel quality indicator parameter, a rank indicator parameter, a layer 1 reference signal received power parameter, and a layer 1 signal-to-interference-plus-noise ratio parameter, wherein the CSI report is destined for a network entity.

28. The UE of claim 21, wherein a second sidelink CSI reporting set, of the multiple sidelink CSI reporting sets, includes a channel quality indicator parameter and a precoding matrix indicator parameter, wherein the CSI report is destined for a relay UE and not a network entity.

29. The UE of claim 21, wherein the configuration indicates a mapping between sidelink CSI reporting sets, of the multiple sidelink CSI reporting sets, and corresponding index values, and wherein the indication of the sidelink CSI reporting set includes an index value of the corresponding index values.

30. A network entity for wireless communication, comprising:
a memory; and
one or more processors, coupled to the memory, configured to:
transmit a configuration that indicates multiple sidelink channel state information (CSI) reporting sets, wherein different sidelink CSI reporting sets include different combinations of CSI parameters, and wherein the different sidelink CSI reporting sets are associated with one or more different destinations; and
transmit an indication of a sidelink CSI reporting set, of the multiple sidelink CSI reporting sets, to be reported in a sidelink CSI report to one or more destinations associated with the indicated sidelink CSI reporting set, the one or more destinations comprising one or more wireless communication devices.

* * * * *